US007775458B2

(12) United States Patent
Linstedt et al.

(10) Patent No.: US 7,775,458 B2
(45) Date of Patent: *Aug. 17, 2010

(54) AUTOMATED CLEANSING SPRAYER

(75) Inventors: Brian K. Linstedt, Ostrander, OH (US); Keith H. Gausmann, Delaware, OH (US); Cathal L. Fahy, Columbus, OH (US); Luke C. Stonis, Columbus, OH (US); Dale Aberegg, Mt. Vernon, OH (US); Michael C. Fryan, Racine, WI (US); Padma Prabodh Varanasi, Racine, WI (US); Steven A. Zach, Racine, WI (US); Peter M. Neumann, Racine, WI (US); Craig F. Shiesley, Camberley (GB); Terry M. Kovara, Racine, WI (US)

(73) Assignee: S.C. Johnson & Son, Inc., Racine, WI (US)

(*) Notice: Subject to any disclaimer, the term of this patent is extended or adjusted under 35 U.S.C. 154(b) by 336 days.

This patent is subject to a terminal disclaimer.

(21) Appl. No.: 10/950,338

(22) Filed: Sep. 24, 2004

(65) Prior Publication Data

US 2005/0127204 A1 Jun. 16, 2005

Related U.S. Application Data

(62) Division of application No. 09/993,206, filed on Nov. 16, 2001, now Pat. No. 6,820,821.

(60) Provisional application No. 60/283,894, filed on Apr. 13, 2001.

(51) Int. Cl.
*A01G 27/00* (2006.01)
*B05B 3/16* (2006.01)

(52) U.S. Cl. ........................................ 239/70; 239/242

(58) Field of Classification Search ............ 239/222.11, 239/345, 379, 67–72, 95, 93, 225.1, 242, 239/240, 538, 569, 302, 371
See application file for complete search history.

(56) References Cited

U.S. PATENT DOCUMENTS 553,760 A 12/1896 Bultman (Continued)

FOREIGN PATENT DOCUMENTS

DE 19905614 11/2000

(Continued)

OTHER PUBLICATIONS

On or about Oct. 26, 2001 a U.S. provisional application was filed by Michael Allen, Paul Blankenship, and Jeff Mauch for a "Cleaning Device for Enclosed Areas". Applicant can swear behind the Oct. 26, 2001 date if any regular U.S. application was filed based thereon which issues.

*Primary Examiner*—Davis Hwu

(57) ABSTRACT

The invention relates to an automated sprayer for spraying the walls of a bath and shower enclosure with a cleanser. The sprayer has a housing that can be mounted inside the shower enclosure and that defines a tray in which an inverted bottle of cleanser is stored. The bottom of the tray has a tube extending downwardly along a longitudinal axis through which the cleanser can pass. A motorized head disposed beneath the tube can be rotated about the axis for metering cleanser from the bottle and spraying cleanser outward. The sprayer includes timer circuitry that delays commencement of a spray for a set time and automatically stops spraying after a predetermined period. The sprayer also includes a system for signaling the beginning of a spray cycle including audio and visual alarms. The invention focuses on methods of using such equipment, as well as a container for supplying such equipment.

8 Claims, 21 Drawing Sheets

U.S. PATENT DOCUMENTS

| | | | | | |
|---|---|---|---|---|---|
| 992,348 | A | | 5/1911 | Goldsmith et al. | |
| 1,488,356 | A | | 3/1924 | Linke | |
| 1,621,092 | A | | 3/1927 | Toffteen | |
| 1,681,160 | A | | 8/1928 | Anthony | |
| 2,233,855 | A | | 3/1941 | Suss | |
| 2,254,269 | A | | 9/1941 | Clark et al. | |
| 2,582,752 | A | | 1/1952 | Harr | |
| 2,726,666 | A | | 12/1955 | Oxford | |
| 2,757,960 | A | | 8/1956 | Hatcher | |
| 2,836,464 | A | | 5/1958 | Dickinson | |
| 2,876,039 | A | | 3/1959 | Vogdt | |
| 2,887,273 | A | | 5/1959 | Anderson et al. | |
| 2,977,963 | A | | 4/1961 | Klint | |
| 2,983,452 | A | | 5/1961 | Lindbloom | |
| 2,986,338 | A | | 5/1961 | Foster | |
| 2,997,243 | A | | 8/1961 | Kolb | |
| 3,053,419 | A | | 9/1962 | Palmer | |
| 3,098,586 | A | | 7/1963 | Wasserberg | |
| 3,125,297 | A | | 3/1964 | Copeland et al. | |
| 3,132,350 | A | | 5/1964 | Carlson | |
| 3,133,702 | A | | 5/1964 | Stelchek | |
| 3,230,550 | A | | 1/1966 | Carlson | |
| 3,246,850 | A | | 4/1966 | Bourke | |
| 3,305,134 | A | * | 2/1967 | Carmichael et al. | 222/645 |
| 3,406,913 | A | | 10/1968 | Frangos | |
| 3,409,230 | A | | 11/1968 | Eelkema | |
| 3,497,108 | A | | 2/1970 | Mason | |
| 3,627,176 | A | | 12/1971 | Sailors | |
| 3,628,733 | A | | 12/1971 | Kahn | |
| 3,666,144 | A | | 5/1972 | Winder | |
| 3,675,251 | A | * | 7/1972 | Ruscher, Jr. | 4/617 |
| 3,685,695 | A | | 8/1972 | Yuhas | |
| 3,719,168 | A | | 3/1973 | Kazee | |
| 3,722,749 | A | | 3/1973 | Ishida | |
| 3,739,944 | A | * | 6/1973 | Rogerson | 222/649 |
| 3,767,125 | A | | 10/1973 | Gehras et al. | |
| 3,809,317 | A | * | 5/1974 | Bender | 239/251 |
| 3,826,408 | A | | 7/1974 | Berndt et al. | |
| 3,828,975 | A | | 8/1974 | Robandt, II et al. | |
| 3,833,010 | A | | 9/1974 | McDermott et al. | |
| 3,848,775 | A | | 11/1974 | Possell | |
| 3,945,571 | A | | 3/1976 | Rash | |
| 3,952,916 | A | | 4/1976 | Phillips | |
| 3,974,941 | A | | 8/1976 | Mettler | |
| 4,063,664 | A | | 12/1977 | O'Neil | |
| 4,131,232 | A | | 12/1978 | Pollinzi | |
| 4,183,105 | A | | 1/1980 | Womack | |
| 4,216,553 | A | | 8/1980 | Haberle | |
| 4,218,013 | A | | 8/1980 | Davison | |
| 4,222,523 | A | | 9/1980 | Bals | |
| 4,272,019 | A | * | 6/1981 | Halaby, Jr. | 239/8 |
| 4,337,885 | A | | 7/1982 | Stahler | |
| 4,383,341 | A | | 5/1983 | Altman | |
| 4,387,811 | A | * | 6/1983 | Ragir et al. | 211/119 |
| 4,405,087 | A | | 9/1983 | Mata-Garza | |
| 4,411,387 | A | | 10/1983 | Stern et al. | |
| 4,415,797 | A | | 11/1983 | Choustoulakis | |
| 4,421,249 | A | | 12/1983 | Williamson et al. | |
| 4,562,867 | A | | 1/1986 | Stouffer | |
| 4,582,255 | A | | 4/1986 | Won | |
| 4,624,411 | A | | 11/1986 | Won | |
| 4,721,246 | A | * | 1/1988 | Lefebvre et al. | 239/70 |
| 4,779,797 | A | | 10/1988 | Robinson | |
| 4,867,870 | A | | 9/1989 | Kettlety et al. | |
| 4,872,225 | A | | 10/1989 | Wagner | |
| 4,921,150 | A | | 5/1990 | Lagergren et al. | |
| 4,941,519 | A | | 7/1990 | Sestak et al. | |
| 4,998,850 | A | | 3/1991 | Crowell | |
| 5,012,961 | A | | 5/1991 | Madsen et al. | |
| 5,014,884 | A | | 5/1991 | Wunsch | |
| 5,021,939 | A | | 6/1991 | Pulgiese | |
| 5,025,962 | A | | 6/1991 | Renfro | |
| 5,029,729 | A | | 7/1991 | Madsen et al. | |
| 5,037,487 | A | | 8/1991 | Santos | |
| 5,038,972 | A | | 8/1991 | Muderlak et al. | |
| 5,063,880 | A | * | 11/1991 | Bouthillier | 119/667 |
| 5,086,950 | A | | 2/1992 | Crossdale et al. | |
| 5,249,718 | A | | 10/1993 | Muderlak | |
| 5,301,873 | A | | 4/1994 | Burke et al. | |
| 5,395,053 | A | | 3/1995 | Frech | |
| 5,411,185 | A | | 5/1995 | Drobish | |
| 5,452,485 | A | | 9/1995 | Ross | |
| 5,516,045 | A | | 5/1996 | Baudin | |
| D371,479 | S | | 7/1996 | Hirst | |
| 5,588,595 | A | | 12/1996 | Sweet et al. | |
| 5,639,026 | A | | 6/1997 | Woods | |
| 5,735,465 | A | | 4/1998 | Laforcade | |
| 5,785,250 | A | | 7/1998 | De Laforcade | |
| 5,791,520 | A | | 8/1998 | Tichenor | |
| 5,823,390 | A | | 10/1998 | Muderlak et al. | |
| 5,826,570 | A | | 10/1998 | Goodman et al. | |
| 5,836,482 | A | | 11/1998 | Ophardt et al. | |
| 5,842,682 | A | | 12/1998 | Schennum et al. | |
| 5,848,736 | A | | 12/1998 | Boumann | |
| 5,853,034 | A | | 12/1998 | Edwards et al. | |
| 5,901,907 | A | | 5/1999 | Hildebrandt | |
| 5,938,076 | A | | 8/1999 | Ganzeboom | |
| 6,000,474 | A | | 12/1999 | Warnick et al. | |
| 6,036,056 | A | | 3/2000 | Lee et al. | |
| 6,042,023 | A | | 3/2000 | Ask | |
| 6,095,370 | A | | 8/2000 | Rhine et al. | |
| 6,109,361 | A | | 8/2000 | Henderson | |
| 6,142,750 | A | | 11/2000 | Benecke | |
| 6,179,166 | B1 | | 1/2001 | Dallas, Jr. | |
| 6,182,767 | B1 | | 2/2001 | Jackson | |
| 6,182,904 | B1 | | 2/2001 | Ulczynski et al. | |
| 6,321,941 | B1 | | 11/2001 | Argentieri et al. | |
| 6,328,543 | B1 | | 12/2001 | Benecke | |
| 6,386,392 | B1 | | 5/2002 | Argentieri et al. | |
| 6,390,329 | B1 | | 5/2002 | Maddox | |
| 6,390,335 | B1 | | 5/2002 | Lawson et al. | |
| 6,463,600 | B1 | | 10/2002 | Conway et al. | |
| 6,651,270 | B1 | | 11/2003 | Porter | |

FOREIGN PATENT DOCUMENTS

| | | | |
|---|---|---|---|
| EP | 365 770 | B1 | 5/1990 |
| EP | 369 722 | B1 | 5/1990 |
| EP | 1 118 300 | A1 | 7/2001 |
| EP | 1 190 653 | A1 | 3/2002 |
| EP | 1 191 166 | A1 | 3/2002 |
| EP | 1 191 167 | A1 | 3/2002 |
| JP | 62-156362 | A | 7/1987 |
| JP | 1-126189 | U | 8/1989 |
| JP | 40-17656 | U | 2/1992 |
| JP | 10-328059 | | 12/1998 |
| JP | 10-328060 | | 12/1998 |
| JP | 2000-201844 | | 7/2000 |
| WO | WO 96/22346 | | 7/1996 |
| WO | WO 98/02511 | | 1/1998 |
| WO | WO 00/32315 | | 6/2000 |
| WO | WO 01/23510 | A2 | 4/2001 |
| WO | WO 01/52709 | A1 | 7/2001 |
| WO | WO 01/52710 | A1 | 7/2001 |
| WO | WO02/26095 | A1 | 4/2002 |

* cited by examiner

FIG. 1
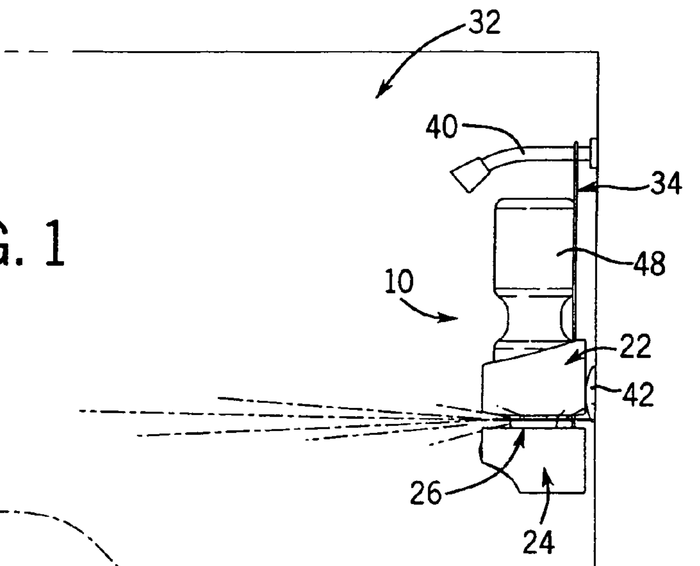
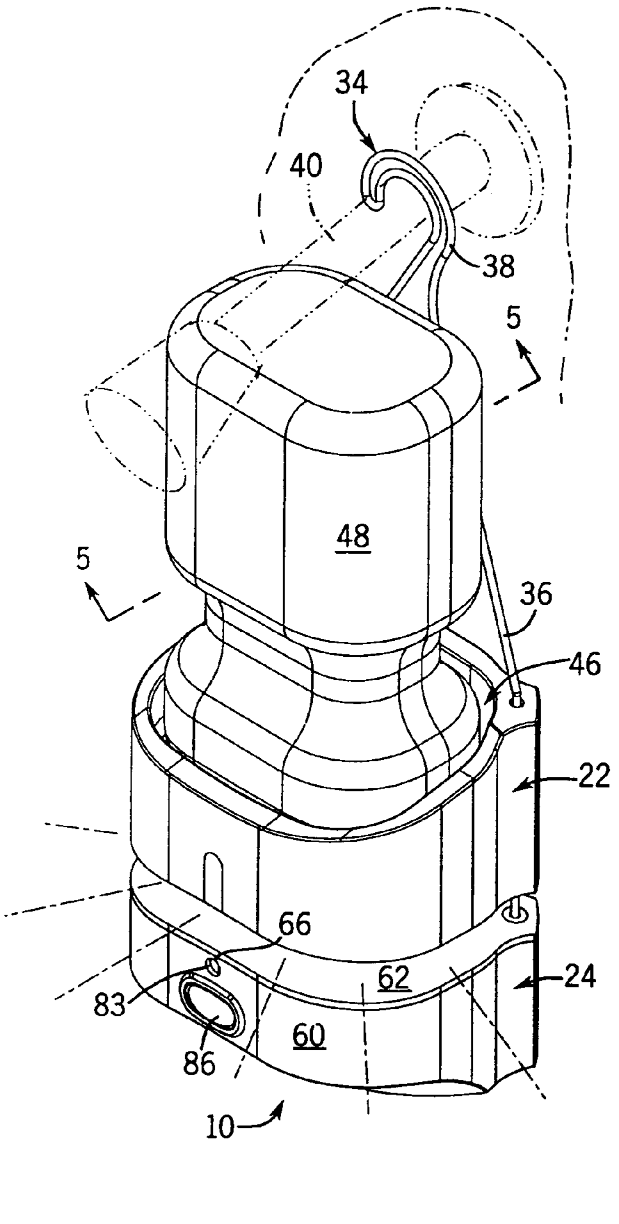
FIG. 2

FIG. 6
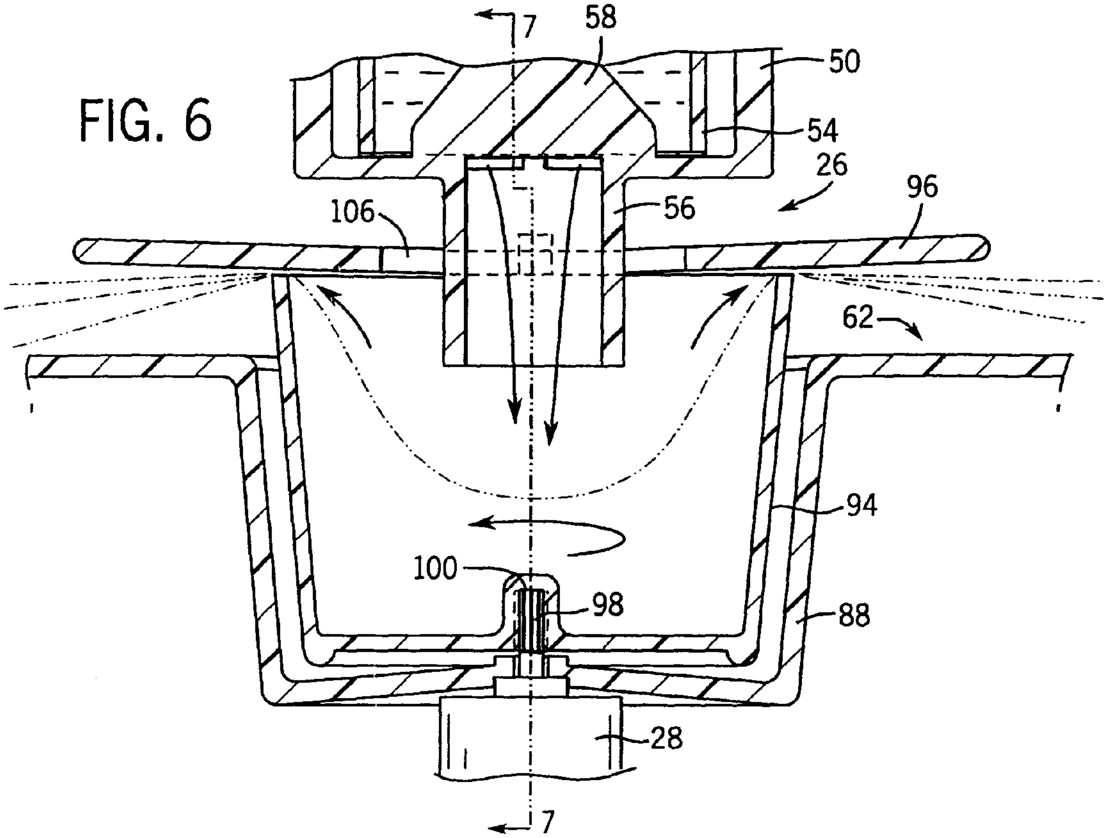
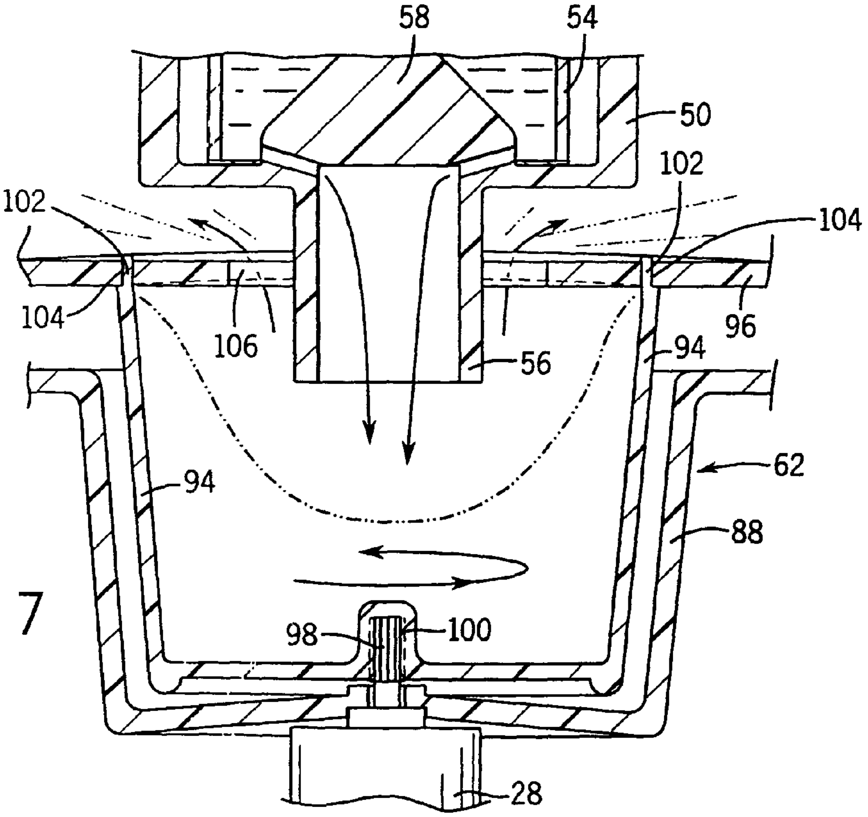
FIG. 7

FIG. 20
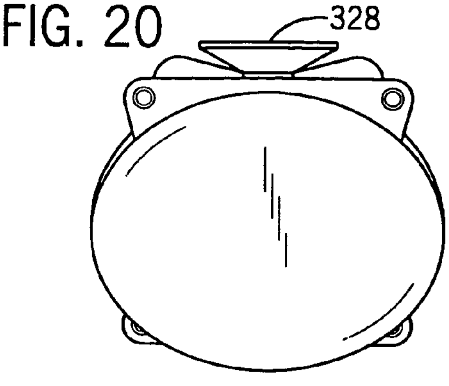
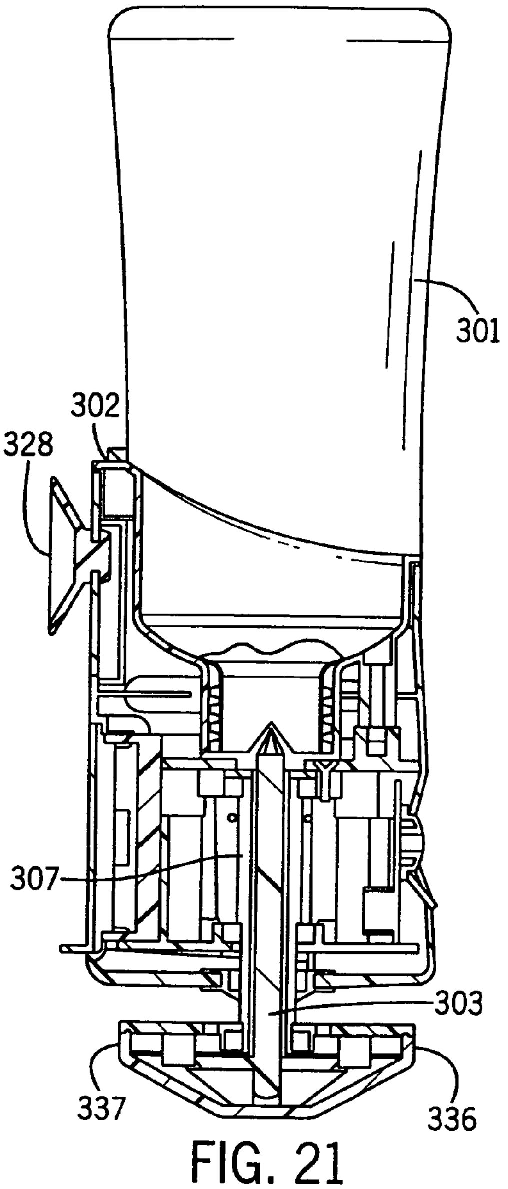
FIG. 21
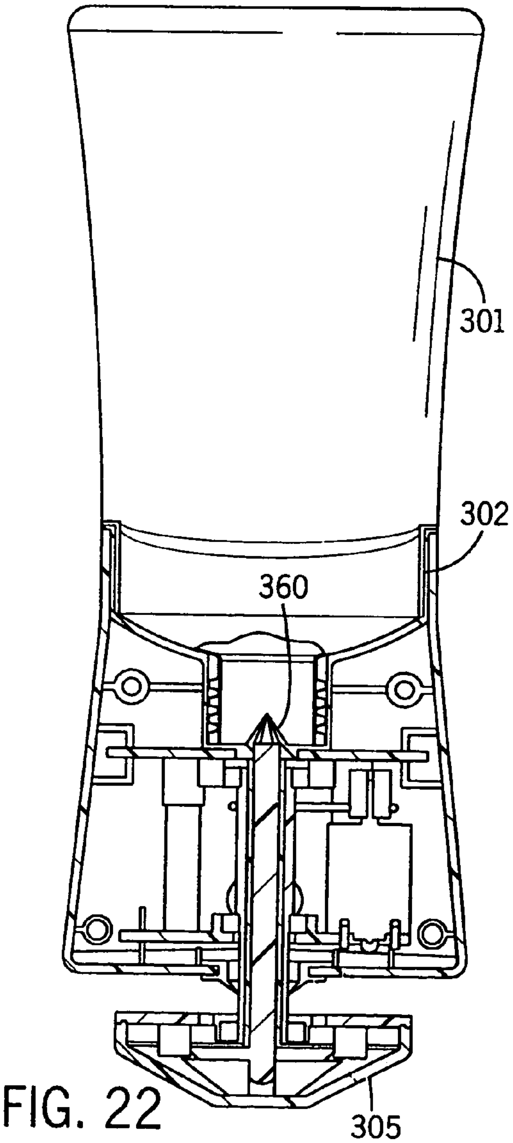
FIG. 22

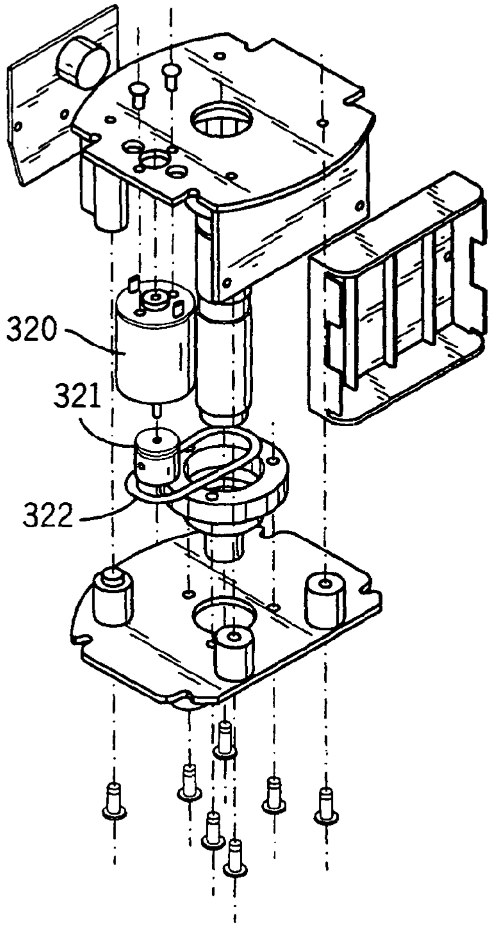
FIG. 27
FIG. 28
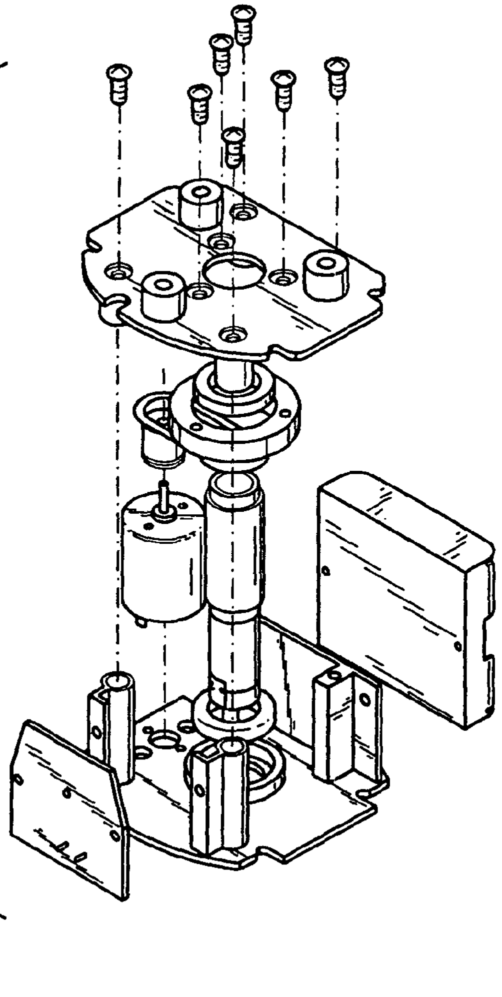

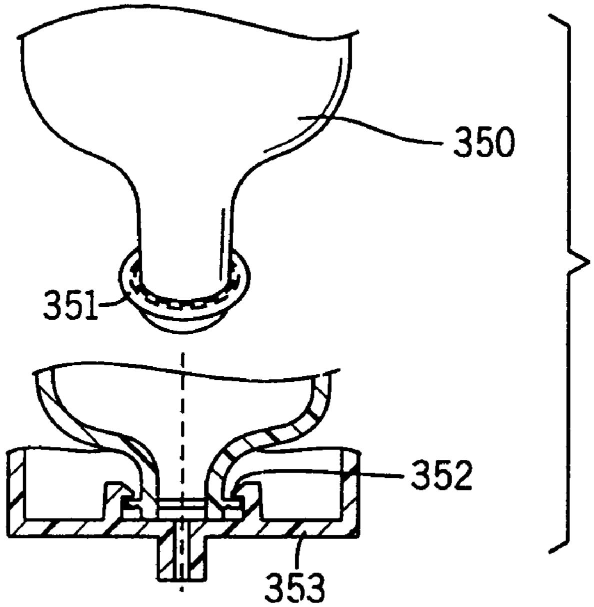
FIG. 32
FIG. 33
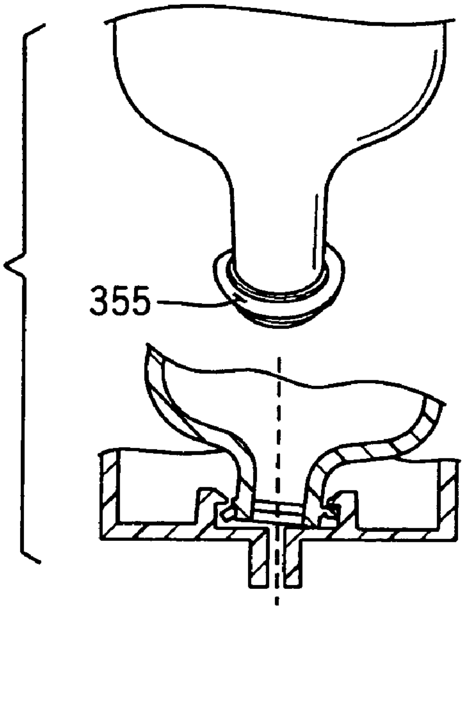

AUTOMATED CLEANSING SPRAYER

CROSS-REFERENCE TO RELATED APPLICATIONS

This is a divisional application claiming priority based on U.S. Ser. No. 09/993,206 which was filed on Nov. 16, 2001 now U.S. Pat. No. 6,820,821 which in turn claims priority based on U.S. provisional application 60/283,894 which was filed Apr. 13, 2001.

STATEMENT OF FEDERALLY SPONSORED RESEARCH OR DEVELOPMENT

Not applicable.

BACKGROUND OF THE INVENTION

This invention relates to an apparatus for cleaning bath and shower enclosures, and in particular to methods for using such apparatus and containers for supplying cleanser to such an apparatus.

The walls and doors of bath and shower enclosures can become mildewed, or coated with soap build up and hard water and mineral deposits, after extended periods of use. Removing these deposits and stains normally requires one to scrub the walls and doors by hand, which is an undesirable task. A cleaning solution can be used to reduce the amount of scrubbing needed.

Cleansers (e.g. a surfactant containing formula) are typically sprayed onto the walls and, after allowing the active ingredients time to work, the walls are wiped with a cloth, brush, or scrubbing pad and then rinsed with water to remove dirt and the cleanser residue. However, some cleansers have been developed and marketed that can remove deposits without the need to scrub the walls. These cleansers have been sprayed onto the walls after the enclosure has been used, and then allowed time to work. See generally, WO 96/22346 and WO 98/02511. The assignee of the present invention, S.C. Johnson & Son, Inc., also sells shower cleaners that act without the need for scrubbing.

One technique used for applying the no-scrub, no-rinse cleansers, for example, is to keep a pump spray bottle of the cleanser in or near the shower enclosure so that one can spray down the walls of the shower enclosure after showering. However, this requires a consumer to spend the time and effort to spray down the walls.

Some systems have been developed to reduce the labor involved in enclosure cleaning. U.S. Pat. No. 4,872,225 discloses a sprayer and conduit system for a bath and shower enclosure in fluid communication with the water supply to a shower head. Supply water is directed to the showerhead or diverted to the sprayer for cleaning the enclosure. A container of cleanser is mounted in the shower enclosure for introducing cleanser (through an injector assembly) into the conduit for spraying cleanser on the walls. A drawback with this system is that the user must manually turn on the supply water (if not already on), adjust the diverter, squeeze cleanser into the sprayer and shut off the water after the walls have been washed. There is also some risk that the consumer will be sprayed with the cleanser.

Other systems are more elaborate, such as that disclosed in U.S. Pat. No. 4,383,341, which includes multiple pop-out spray nozzles connected by a manifold to a mixing valve where cleaning concentrate is mixed with water. U.S. Pat. No. 5,452,485 discloses an automatic cleaning device for a tub and shower having large, powered tub and shower "gliders" that move in tracks around the tub and shower stall, respectively. The gliders are coupled to the water supply, which is mixed with a cleanser. The gliders have spray heads for spraying the cleaning solution on the tub and shower walls. The gliders also have brushes for scrubbing the walls. A user operates the gliders and cleanser mixing by a central controller. These systems are disadvantageous because they are large, unsightly, expensive and can require considerable installation time and cost.

Accordingly, there exists a need in the art for an improved system for automatically spraying down a bath and shower enclosure, and methods for using such a system, and containers for supplying such a system.

SUMMARY OF THE INVENTION

The invention relates to a device for automatically spraying the walls of a bath and shower enclosure with a shower cleanser.

One aspect of the invention is a method of automatically spraying a shower enclosure with a liquid cleanser. One activates a timer on a sprayer to initiate a first countdown. At the expiration of the first countdown, one automatically sprays cleanser at side walls of the enclosure. One then automatically terminates the spray cycle at the expiration of a second countdown following the first countdown.

In preferred forms, the sprayer has a metering system for controlling flow of the cleanser, a spray head for spraying cleanser during a spray cycle, and a control for initiating the spray cycle and automatically terminating it. There can be a container containing the cleanser, a tray sized to receive the container in an inverted fashion, and an integral tube extending downwardly and through which cleanser can be metered by the metering system to the spray head.

In especially preferred forms there is an electrical timer coupled to the metering system for delaying activation thereof after the spray cycle is initiated, and/or a user notification system including a light or sound alarm. Further, the sprayer can have a motorized spray head.

A particularly desirable feature of the invention is that the sprayer can be configured so as to be mountable wholly within the enclosure, and when so mounted can spray the cleanser even when the sprayer does not receive water from a water supply of a building in which the enclosure is located.

Another aspect of the invention focuses on the container alone. The container can be provided at its bottom with an integral soap dish having a support platform and drainage channel. A separate shower caddy is therefore not needed to hold the soap used during typical showers.

An important advantage provided by these devices is automated cleaning of enclosures. The touch of a button on the sprayer initiates a spray cycle that terminates automatically on completion, thereby freeing the user from monitoring or terminating the cleaning process.

Another advantage is to spray down all side walls of such an enclosure.

Another advantage is to make adding more cleanser to the sprayer quick and simple. The housing of the sprayer can be shaped to conform to the upper portion of refill bottles of shower cleanser. Moreover, the housing can include an integral spike for puncturing the inner seal on the bottle as it is inserted in place. Replenishing the cleanser is simply a matter of removing the cap from a new bottle, inverting it, and loading it into the housing.

Yet another advantage is that the sprayer automatically meters out the proper volume of cleanser for each spray cycle. The volume can be easily altered for different sized enclosures by changing the timer to increase or decrease the duration of the spray cycle, or by changing the speed of rotation.

Still another advantage is that it can be a stand alone device with its own pumping system using cleanser that is not mixed with water.

An additional advantage is that it can be removably mounted in the enclosure without damaging the walls.

These and other advantages of the invention will be apparent from the detailed description and drawings.

BRIEF DESCRIPTION OF THE DRAWINGS

FIG. 1 is side view of an automated sprayer of the present invention mounted to a shower spout in a shower enclosure;

FIG. 2 is a frontal, top perspective view thereof;

FIG. 6 is an enlarged cross-section view of the metering and spray head components;

FIG. 7 is a partial cross-section view taken along line 7-7 of FIG. 6;

FIG. 20 is a top plan view thereof;

FIG. 21 is a partial sectional view taken along line 21-21 of FIG. 18;

FIG. 22 is a partial sectional view taken along line 22-22 of FIG. 19;

FIG. 27 is an exploded upside down, rear perspective view of the FIG. 26 motor;

FIG. 28 is an exploded top perspective view of the FIG. 26 motor;

FIG. 32 depicts schematically a single use container and a receiver element for it;

FIG. 33 depicts how the receiver element destroys part of the bottle when the two are separated;

DETAILED DESCRIPTION OF THE PREFERRED EMBODIMENTS

Figure 3:
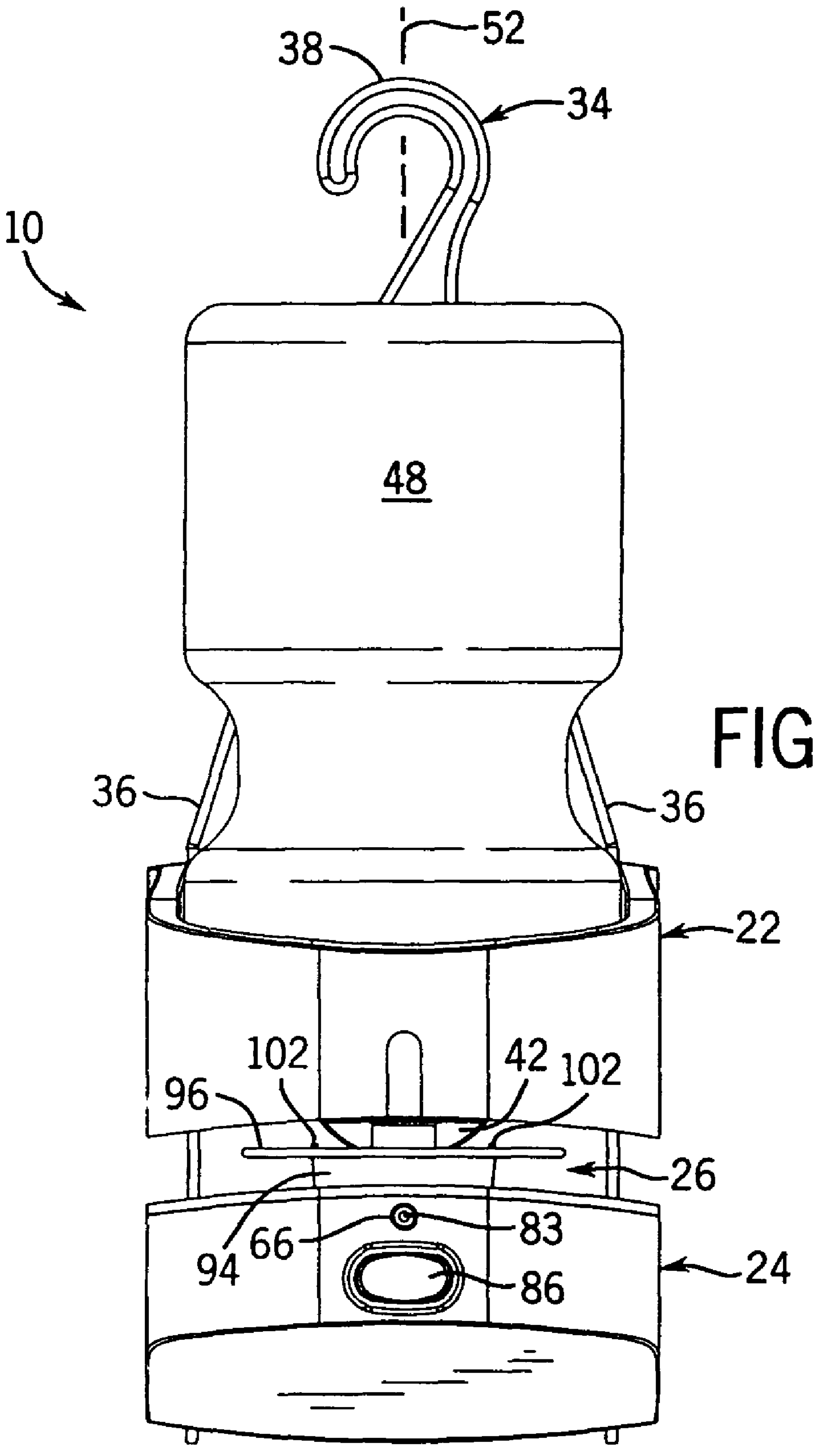
FIG. 3 is a front elevational view of the automated sprayer.
Figure 4:
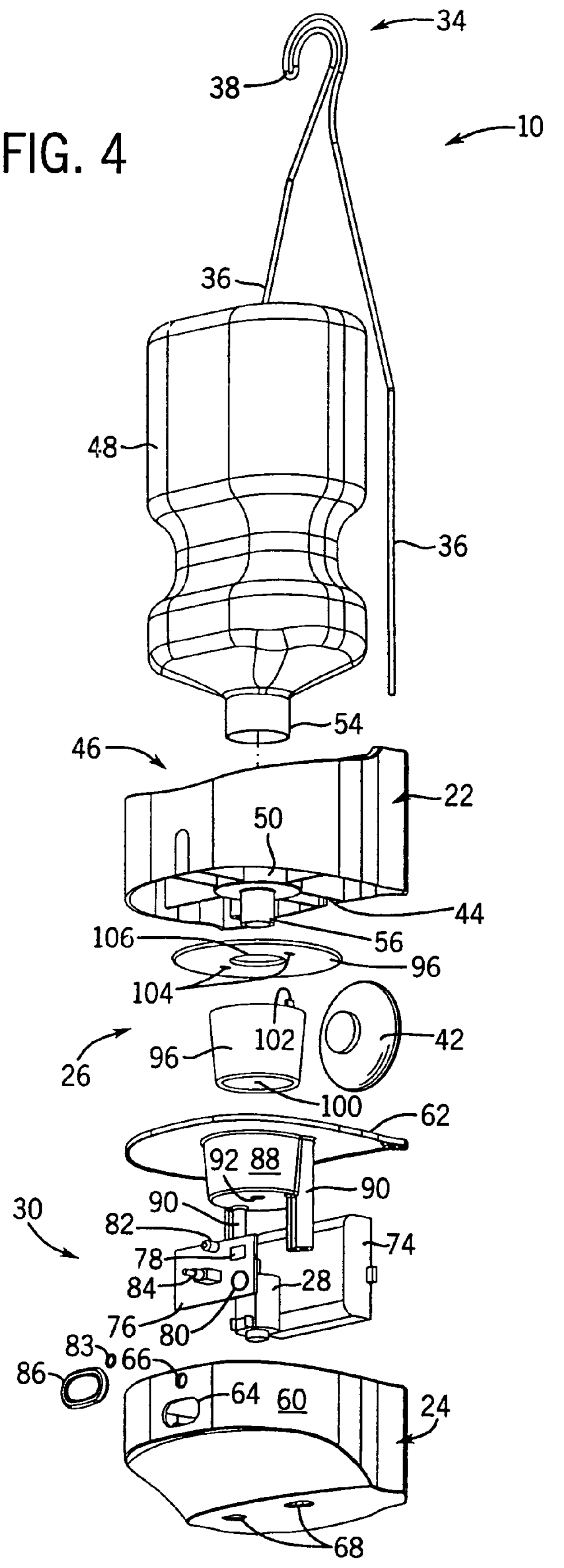
FIG. 4 is an exploded perspective view thereof.

An automated sprayer of the invention is generally referred to in the figures by number 20. With reference to FIGS. 1-5, the sprayer 20 includes as main components a holder tray 22, an electronics housing 24, a spray head assembly 26, and an electric motor 28 with electronic circuitry 30 for control, timing, and user notification. The sprayer 20 is mounted inside a bath and shower surround enclosure 32, preferably at the wall containing the shower head. A hanger 34 has two legs 36 connected at a lower end to the electronics housing 24 and extending through openings in the tray 22 to form a hook 38 sized to fit over a shower head spout 40. The sprayer 20 can be further (or alternatively) secured to the wall of the enclosure by suction cups 42 engaged in a vertical slot 44 in the back side of the tray 22. When so mounted, the spray stream is approximately 5 feet high. Suitable spacers (not shown) can maintain a gap between the tray 22 and housing 24.

Figure 5:
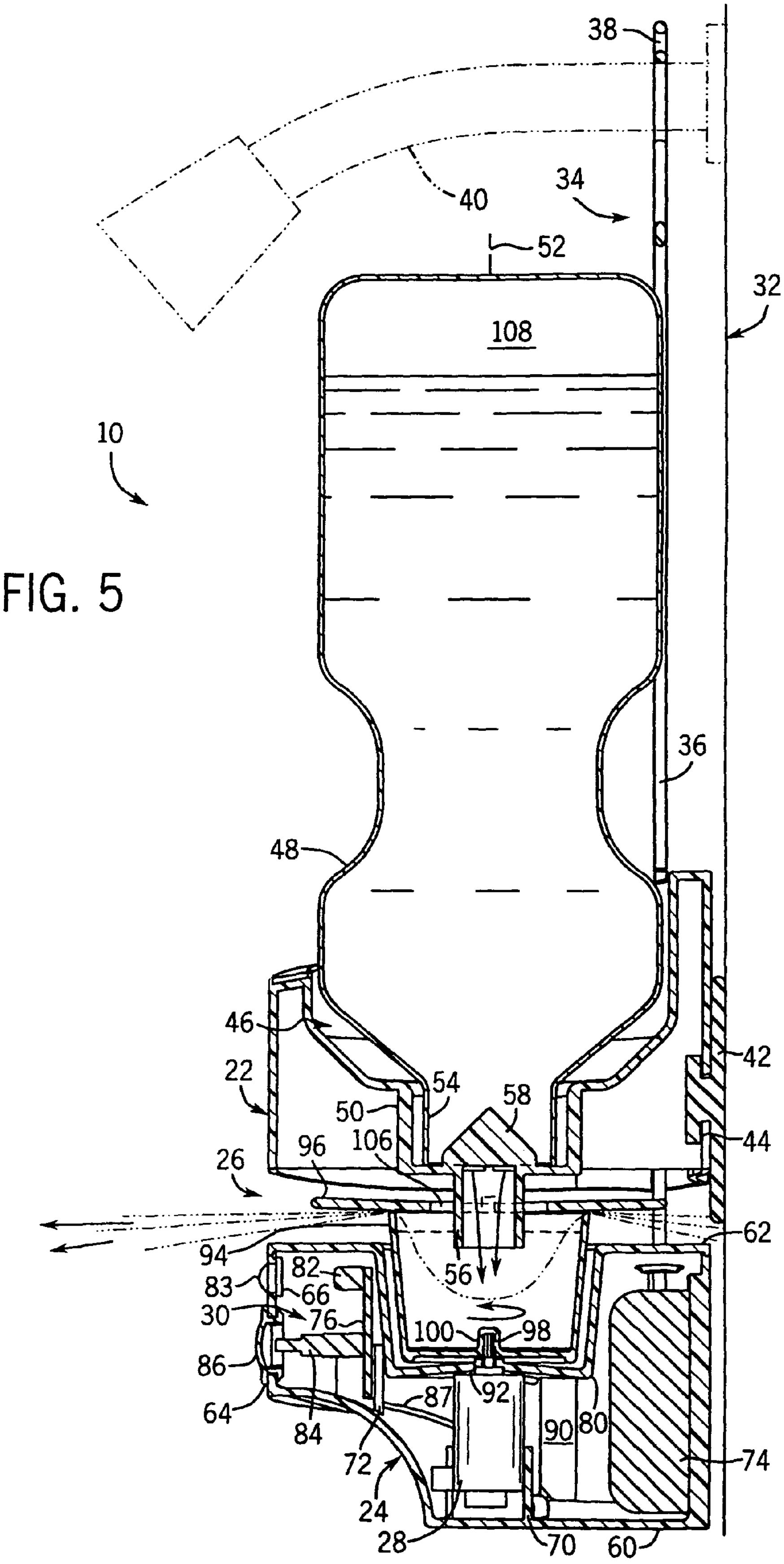
FIG. 5 is a side cross-section view taken along line 5-5 of FIG. 1.

The tray 22 and the electronics housing 24 can be injection molded of a suitable plastic. The tray 22 is formed with an upwardly opening cavity 46 conforming to the shape of a bottle top 48 containing a liquid solution of shower cleanser, such as one of the no scrub formulations mentioned above. The cavity 46 includes a recess 50 at its center extending downwardly along a longitudinal axis 52 and sized to contain the mouth 54 of the bottle 48, as shown in FIG. 5.

An integral guide tube 56 extends axially downwardly concentric with the recess 50 providing a passage for the cleanser through the tray 22. As shown in FIG. 7, an upwardly pointed spike 58 is molded into the recess 50 of the tray 22 for puncturing an inner seal (not shown) that may have been covering the bottle mouth 54.

The electronics housing 24 is molded in two pieces including an upwardly opening base 60 and a removable cover 62. The base 60 includes switch 64 and light 66 openings in the front and two drainage openings 68 in its bottom. The base 60 also includes a motor mount 70 disposed about the axis 52 and a vertical partition 72. The electronic circuitry 30 and the motor 28 are mounted in a vertical orientation with the shaft extending upwardly along the axis 52.

The electronic circuitry 30 includes a battery back 74 and a circuit board 76 containing a timer 78, speaker 80, LED 82, and push button switch 84 mounted to the partition 72 so that the LED 82 is behind the light opening 66 and the switch 84 is behind the switch opening 64. The light opening 66 is sealed water tight by a translucent lens 83, and the switch opening 64 is covered by a water tight membrane 86. The motor 28, battery pack 74, and circuitry 30 are electrically coupled together by suitable wiring 87.

The electrical components are enclosed in the base 60 by the cover 62, which is removably attached to the base in a suitable water tight connection. The cover 62 includes a molded-in cup 88 recessed downwardly along the axis 52 and two drain tubes 90 opening at their top ends and extending down into the drainage openings 68 in the base 60 of the electronics housing 24, thereby providing a drain for cleanser and water that may be splashed onto the top of the cover 62. The recessed cup 88 includes an axial opening 92 through which the motor shaft extends. The opening 92 contains a suitable bearing and seal.

The motor shaft is linked to the spray head assembly 26, which comprises spray cup 94 and annular lid 96, at a splined end 98 that engages a toothed axial recess 100 molded into the center of the spray cup 94. The spray cup 94 has integrally molded pins 102 spaced apart and extending upwardly from its rim. The lid 96 is connected to the spray cup 94 by any suitable engagement, such as fusing or adhering, of the pins 102 with two radially remote openings 104 flanking an axial opening 106 through which the tube 56 of the cleanser tray 22 extends.

Referring now to FIGS. 5, 6 and 7, the sprayer head assembly 26 controls flow of cleanser through the vent tube 56 as well as provides a circular spray pattern preferably extending 3-6 feet so as to spray all of the inner walls of the enclosure. The metering process is performed by controlling a pocket 108 of air trapped at the top of the inverted cleanser bottle. Specifically, before a bottle of cleanser is loaded into the sprayer 10, the spray cup 94 is empty. When a bottle is loaded into the sprayer 10, (i.e., the bottle is inverted and set into the tray 22), a foil seal on the bottle is pierced and cleanser pours out of the bottle and is replaced by an equal volume of air. Because air is lighter than the cleanser, it is displaced to the top of the bottle, where it is trapped because the bottle has no openings at its bottom. Cleanser will continue to pour out of the bottle until the level of cleanser in the spray cup 94 reaches slightly above the end of the tube 56. At this point, no additional cleanser flows from the bottle because of the vacuum created by the air trapped in the bottle. Until the sprayer 10 is operated (or the cup emptied in some other way), the sprayer remains in this state of equilibrium in which no cleanser flows from the bottle.

Energizing the motor 28 rotates the spray cup 94 and lid 96 for a defined period (e.g. 10-20 seconds), which in turn causes the cleanser in the spray 94 to spin around the axis 52, which induces centrifugal force moving the cleanser outward against and upwardly along the wall of the spray cup 94. This reduces the cleanser level at the center of the spray cup 94 where the tube 56 is located thereby venting the bottle so that additional cleanser can flow out to be replaced by more air entering the bottle. Again, cleanser flows into the cup until the end of the tube 56 is submerged. Once the cleanser reaches a significantly high rotational velocity (and the centrifugal force is high enough), the cleanser will be forced through the seam existing between the spray cup 94 and the lid 96.

The lid 96 may flex upward lightly under the pressure of the cleanser, which widens this seam slightly. The cleanser is in any event sprayed out in a circular pattern due to the rotation of the spray head assembly 26. The lid 96 retains the cleanser in the spray cup 94 until the rotational velocity of the cleanser is near that of the spray cup 94 and lid 96. This reduces shearing of the cleanser thereby keeping it in relatively large drops (not atomized or misted) so that a heavy spray stream can be formed and projected the distance necessary to contact the side walls of the enclosure.

When a user wishes to spray the enclosure walls with cleanser (typically immediately after showering), he or she simply depresses the switch 84 at the front of the sprayer 10. This signals the timer 78 to begin a countdown delaying spraying for a predetermined time, such as 20 seconds. This affords the user time to exit the shower enclosure and close the doors or curtains. It also gives the user time to abort the spray cycle by depressing the switch 84 a second time (or alternatively a separate "panic" button). Initially depressing the switch 84 also initiates a user notification system, made up of the speaker 80 and the LED 82, for warning the user of the impending operation of the sprayer 10 by providing an audio tone and a flashing light.

Unless cancelled by the user, the spray cycle begins automatically at the expiration of the countdown. The motor 28 is energized, and the spray head assembly 26 is rotated about the axis 52 so that cleanser in the spray cup 94 is sprayed in a circular pattern. Additional cleanser is metered into the spray cup 94 as needed during the spray cycle. The spray cycle continues until the expiration of a second countdown, preferably another 20 second interval, automatically initiated by the timer 78. At that point the motor 28 is deenergized and the sprayer returns to stand-by mode without further intervention from the user. And, as the spray head assembly 26 slows and stops spinning, additional cleanser is metered into the spray cup 94 until filled above the end of the tube 56. The sprayer 10 is thus ready for another spray cycle at the demand of the user.

The invention thus provides a device for automatically cleaning a bath and shower enclosure. A simple touch of a button initiates a spray cycle that terminates automatically on completion. Consumers do not need to spend time spraying the shower themselves, and there is less risk of exposure to the cleaning solution. All that is required to replenish the cleanser is simply to remove the old bottle, remove the cap from a new bottle, turn it upside down, and load it into the tray.

The sprayer automatically meters out the proper volume of cleanser for the spray cycle. The volume can be easily altered for different sized enclosures by increasing or decreasing the duration of the spray cycle. Moreover, the sprayer does not tie into the water supply lines. This makes the device easy to install in existing shower and tub enclosures at any suitable location in the enclosure. It can also be removably mounted without damaging the walls.

Additionally, the invention can be practiced using various alternative metering and spray mechanisms such as those shown in FIGS. 8-16. In these figures, elements like those in the above-described embodiment are referred to with similar reference numerals albeit with differing suffixes.

Figure 8:
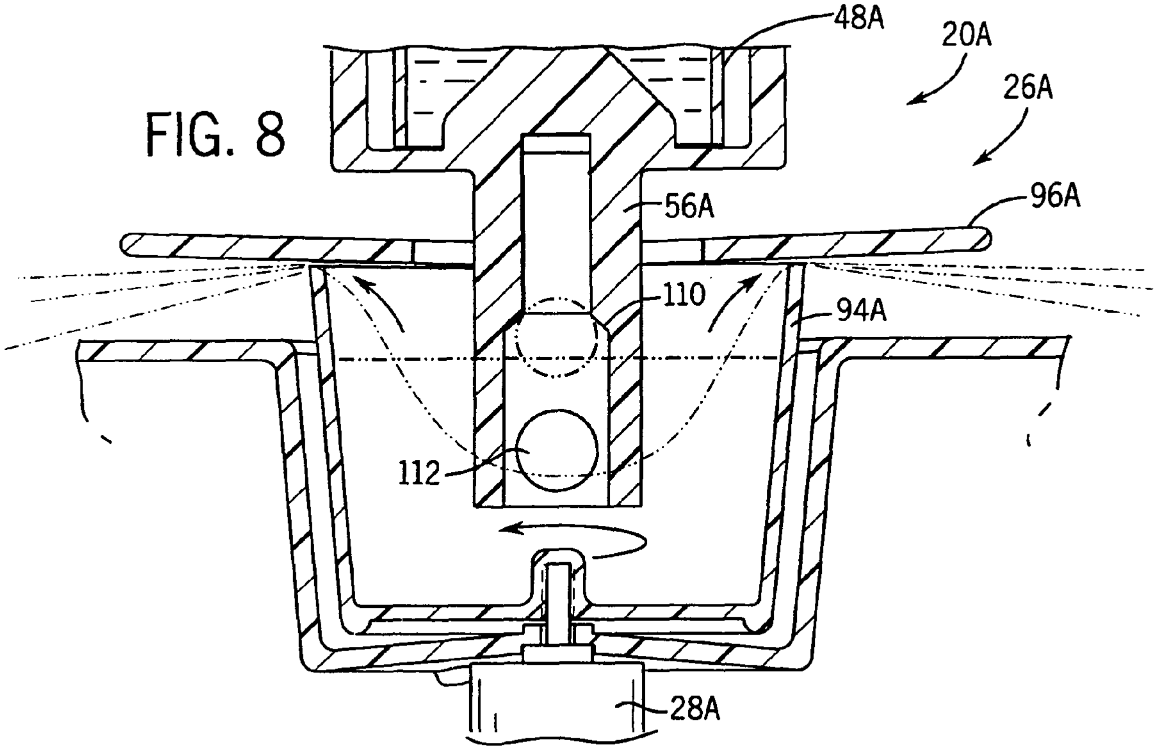
FIG. 8 is a partial cross-section view similar to FIG. 6, albeit with an alternate metering system with a fluid level operated ball valve.

FIG. 8 shows a sprayer 20A with a spray assembly 26A having a spray cup 94A and an annular lid 96A rotated by a motor 28A, as described above. The inner diameter of the tray tube 56A forms a conical valve seat 110 at a distance spaced from its end against which a ball valve 112 can be seated to close off flow through the passage of the tube 56A. The diameter of the ball valve 112 is less than the inner diameter of a portion of the tube 56A but greater than the opening through the valve seat 110 and the opening at the end of the tube 56A such that it is captured in the tube 56A but can float up against the valve seat 110. Thus, when the cleanser level in the spray cup 94A is high enough (as when at rest), the ball valve 112 seats against the valve seat 110 to even more securely close off the tube 56A.

However, when the spray assembly 26A is rotated and the height of the cleanser in the center of the spray cup 94A is reduced, the ball valve 112 floats downward inside the tube 56A to allow cleanser in the bottle 48A to flow through the opening in the valve seat 110, around the ball valve 112 and out the end of the tube 56A.

Although not shown, the valve seat and ball valve could be part of a separate, elongated tube with one end extending along the tube 56A into the spray cup and into the inside of the bottle above the cleanser through the mouth of the bottle or a separate opening therein. This additional tube would thus control flow through the bottle based on the level of cleanser in the spray cup as described above and the original tube integral with the tray would simply provide a passage for cleanser to flow from the bottle to the spray cup. The dedicated tube provides a more consistent flow rate through the bottle independent of the volume of cleanser in the bottle.

Figure 9:
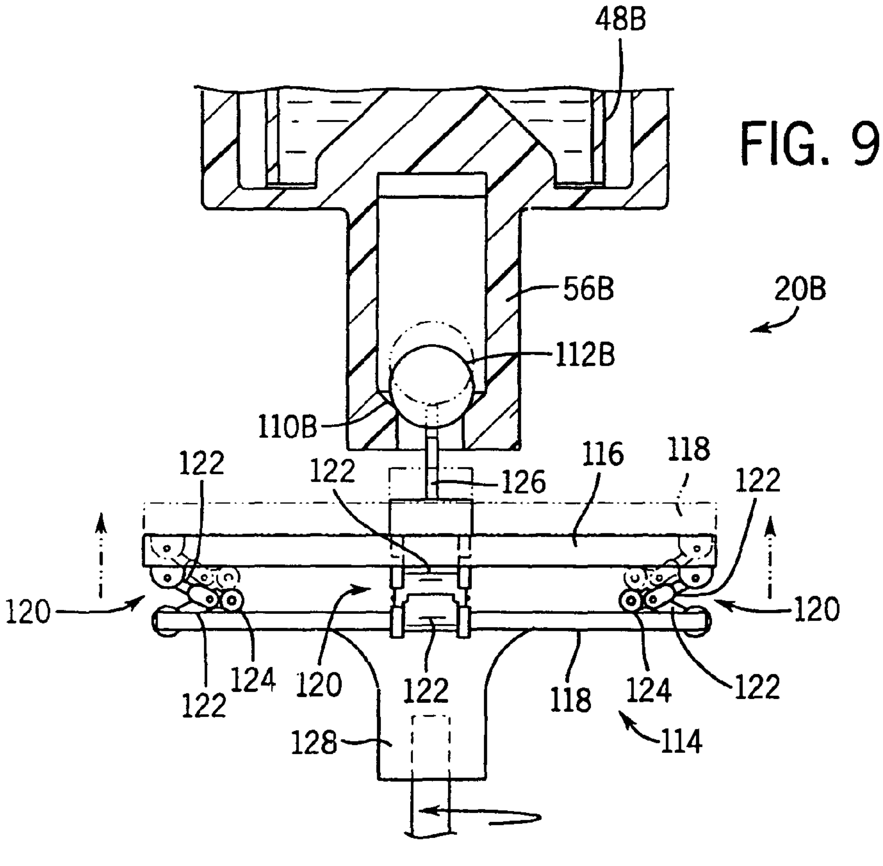
FIG. 9 shows yet another alternate metering system using an inertia operated pin and ball valve.

FIG. 9 shows another sprayer embodiment 20B in which, like that shown in FIG. 8, the tube 56B contains a ball valve 112B that can float therein and seat against a valve seat 110B (at the end of the tube 56B) to close the passage through the tube 56B and stop the flow of cleanser from the bottle. Here the ball valve 112B is operated by an inertial valve 114 that is rotated about the axis by the motor. The inertial valve 114 includes upper 116 and lower 118 disk-shaped plates joined at their peripheries by three hinges 120 spaced apart approximately 120 degrees. Each hinge 120 includes two links 122 pivotally connected together and to the plates 116 and 118 so to move radially inward when the plates 116 and 118 are moved axially toward each other. Each hinge 120 also has a weight 124 projected radially inward from the pivotal connection of the links 122. A pushpin 126 is connected to the upper plate 116 to extend upwardly along the axis. The lower plate 118 is formed to include an axial hub 128 with a recess engaged with the shaft of the motor.

At rest the hinges 120 are collapsed so that the plates 116 and 118 are close together. When the motor is energized, the inertial valve 114 is rotated and the upper plate 116 is moved axially upward due to the weights 124 being driven outward by centrifugal force. This causes the pushpin 126 to contact and raise the ball valve 112B to unseat it from the valve seat 110B so that the cleanser can pass through the tube 56B during the spray cycle (as shown in phantom). When the motor is stopped, the upper plate 116 lowers and the ball valve 112B is reseated to shut off flow through the tube 54B.

Figure 10:
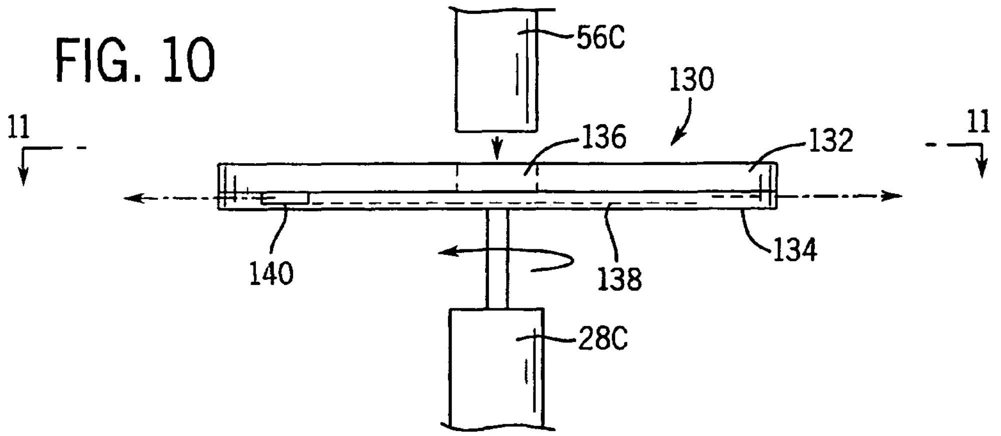
FIG. 10 shows an alternate spray head with a centrifugal disk.
Figure 11:
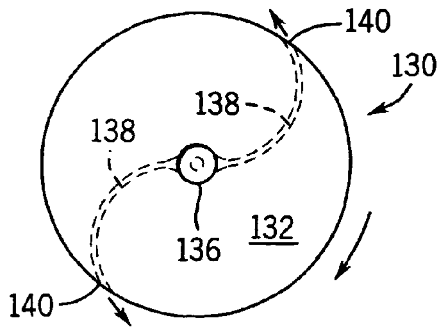
FIG. 11 is a top view of the spray head of FIG. 10.

FIGS. 10-14 illustrate alternate spray mechanisms that can be used to provide a circular spray pattern ranging 3-6 feet or more. For example, FIGS. 10 and 11, show a spray disk 130 having an upper disk 132 and a lower disk 134 joined together by any suitable method, such as by an adhesive. The upper disk 132 has an axial opening 136 providing a recess in the spray disk 130 for receiving cleanser from the tube 56C. The lower disk 134 has an arcuate groove through the axis and opposite points of its periphery forming curved radial passages 138 in the spray disk 130 extending from the axial recess to peripheral outlet ports 140. The spray disk 130 is rotated and cleanser is metered into the axial recess (by any suitable means, such as the ball valve discussed above). Capillary action and centrifugal force will then draw the cleanser through the passages 138 so that the cleanser sprays out the outlet ports 140, forming a circular, pinwheel type spray pattern. The passages 138 are preferably arcuate to increase contact of the cleanser with the walls of the passages and thereby increase the effect of capillary action.

Figure 12:
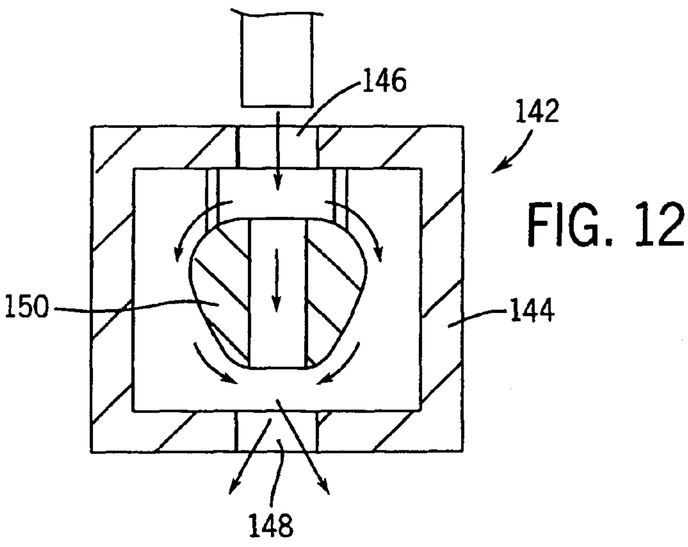
FIG. 12 shows an alternate fluidic oscillator spray head.

FIG. 12 illustrates another alternate spray mechanism including a fluidic oscillator 142, which provides an oscillating spray. See generally U.S. Pat. No. 4,562,867. The fluid oscillator 142 includes a housing 144 with an inlet 146 and an outlet 148 on opposite sides. A barrier member 150 is fixed in the interior of the housing 142 and defines a passage between the inlet 146 and the outlet 148. Thus, cleanser entering the inlet 146 passes through and around the barrier member 150 to the outlet 148. The fluidic oscillator 142 operates, as known in the art, by creating areas of low pressure at alternate sides of the passage through the barrier member 150 to convert the straight flow entering the housing 144 to an oscillating pattern.

The fluidic oscillator 142 can be mounted to a rotating member with the outlet 148 opening radially outward and rotated about the axis by the motor to provide a circular spray pattern. Alternatively, two or more fixed fluidic oscillators spaced around the sprayer could be used to provide a 360 degree spray. This embodiment of the invention can be used with any suitable metering mechanism capable of metering cleanser from the bottle to the inlet(s).

Figure 13:
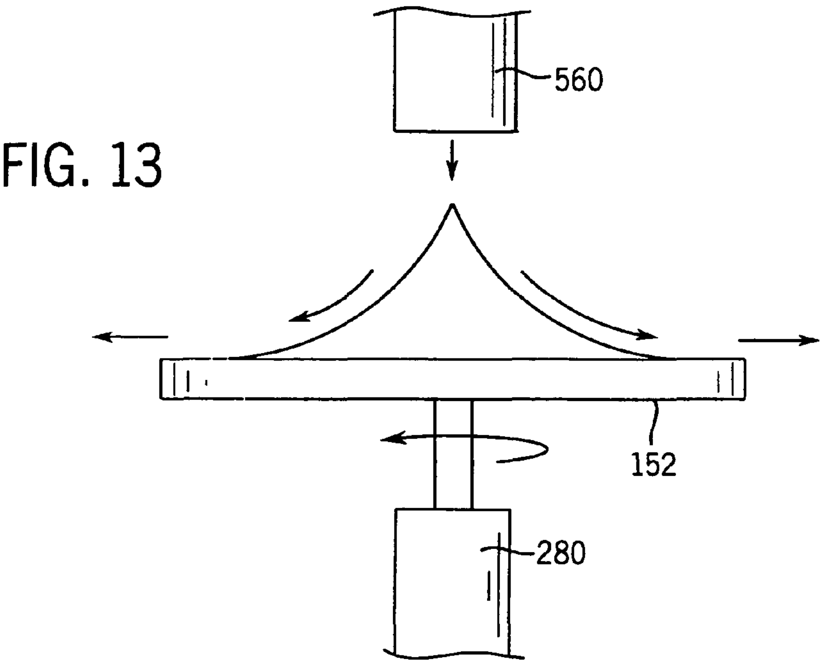
FIG. 13 shows an alternate deflector plate spray head.

FIG. 13 shows another spray head comprising a disk-shaped deflector plate 152 disposed beneath the tube 56D and concentrically mounted to the shaft of the motor 28D. The upper surface of the deflector plate 152 points upwardly at its center and gradually slopes downwardly to its periphery. Thus, during a spray cycle, cleanser is metered (via any suitable method) out of the bottle such that it contacts the sloped surface of the rotating deflector plate 152 and is propelled radially outward in a circular path. This spray head is again particularly suited for use with a pressurized bottle of cleanser, such as an aerosol spray can.

Figure 14:
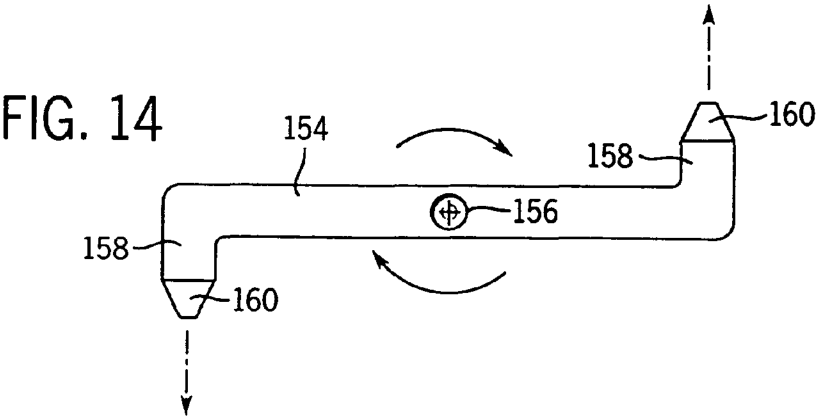
FIG. 14 shows an alternate impeller spray head with nozzles at bent ends.

FIG. 14 shows yet another spray head comprised of a tubular body 154 having an opening 156 aligned with the axis and bend ends 158 with spray nozzles 160. The body 154 is mounted beneath the bottle of cleanser for rotation about the axis. If used with a pressurized or aerosol bottle, it can act as an impeller rotating under the force of the pressured cleanser, otherwise it can be motorized. Alternatively, such a device can be linked to a motor for rotation.

Figure 16:
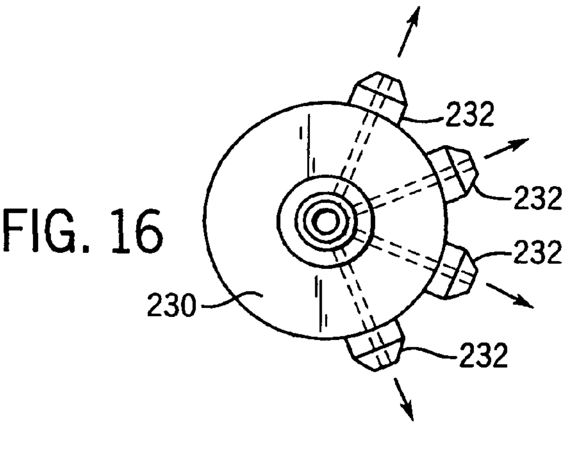
FIG. 16 shows the spray nozzle of FIG. 15.
Figure 15:
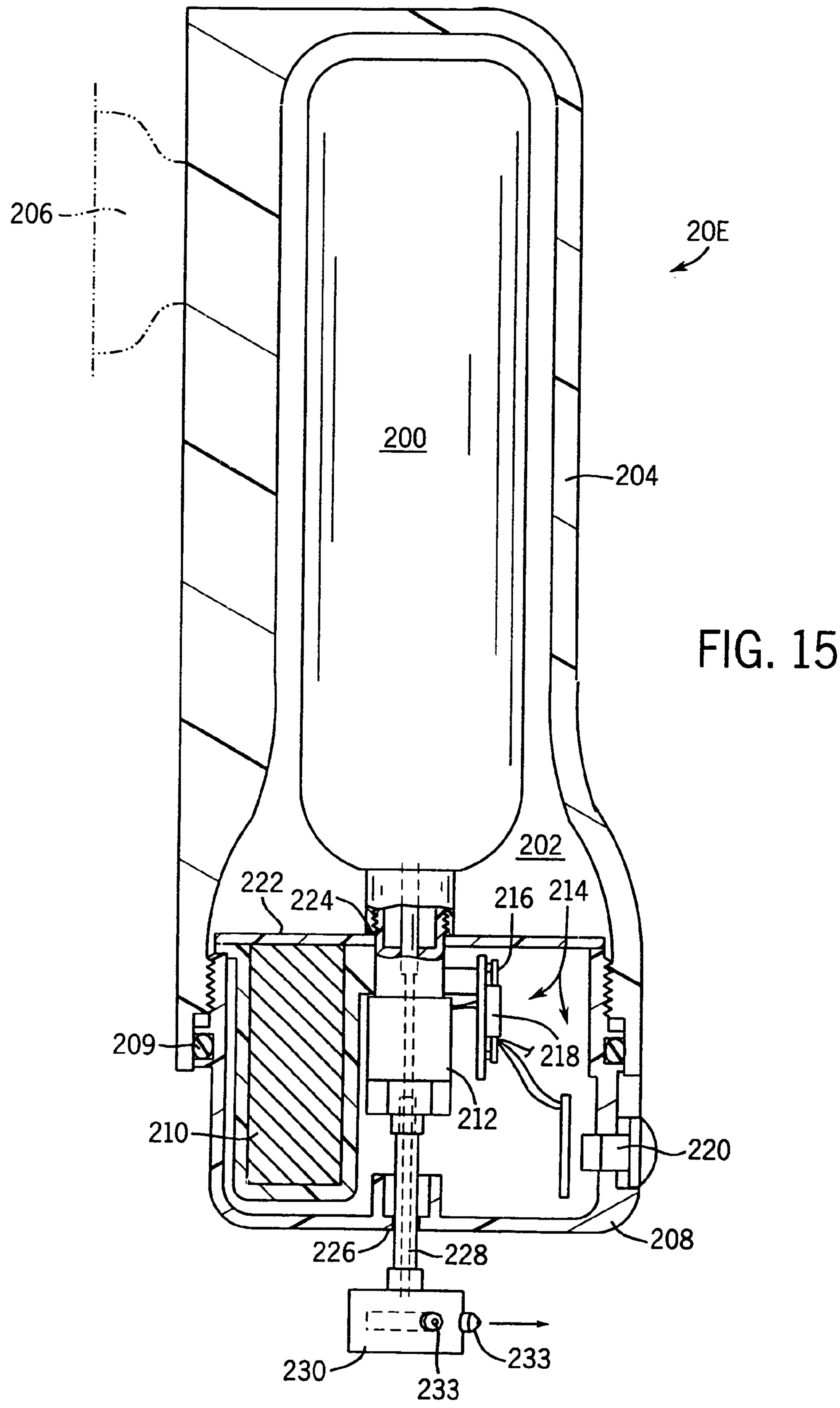
FIG. 15 is a cross-section view of an alternate sprayer for an aerosol can with a stationary spray nozzle.

FIGS. 15 and 16 show still another embodiment of the sprayer 20E. In this embodiment, an inverted spray can 200 of cleanser is contained in a cylindrical cavity 202 defined by an inverted housing 204 that is mounted to the wall of the enclosure with a suction cup 206 and/or other hanging means. The housing 204 is open at the bottom end into which threads an electronics housing 208. An O-ring 209 provides a water tight seal between the housings 204 and 208.

The electronics housing 208 contains a battery pack 210, solenoid valve 212, and timing and user notification circuitry 214, including a timer 216, a speaker 218, an LED (not shown), and switch 220. The electronics housing 208 is enclosed by a cover 222 having an opening 224 at its center allowing the spray can 200 to be threaded to the housing 208. The bottom of the electronics housing 208 also includes a sealed opening 226 through which extends a spray tube 228 leading from the solenoid valve 212 and mounting a spray head 230 at its bottom end. The spray head 230 includes one or more nozzles 232 extending radially outward. The nozzles 232 can be spaced around the spray head 230 to provide a circular spray pattern (for example, four nozzles spaced apart 90 degrees) or to one side (as shown in FIG. 16) to provide a focused spray. Although not shown, it should be noted that the spray head 230 could be mounted to a motor and rotated to provide a circular spray pattern.

The nozzles 232, spray head 230, and spray tube 232 define a fluid passage to the solenoid valve 212 that when open provides fluid communication to the spray can 200 through a passage through a movable metallic core therein. When energized, the core of the solenoid valve 212 moves against (depresses) the valve of the spray can 200 to release the cleanser. The sprayer of this embodiment, performs a sequence of operations similar to the above described embodiments.

In particular, a user begins a spray cycle by depressing the switch 220. This signals the timer 216 to begin a countdown delaying spraying for a predetermined time, such as 20 seconds, during which the user can exit the shower enclosure and close the doors or curtains or abort the spray cycle by depressing the switch 220 a second time. Depressing the switch initially also initiates the user notification system for warning the user of the impending operation of the sprayer by providing an audio tone and a flashing light. Unless cancelled by the user, the spraying begins automatically at the expiration of the countdown at which point the solenoid valve 212 is energized and cleanser is sprayed through the spray head 230. Cleanser continues to flow for the duration of the spray cycle, which ends at the expiration of a second countdown, preferably another 20 second interval, automatically initiated by the timer 216. At that point, the solenoid valve 212 is deenergized and the sprayer returns to stand-by mode and is ready for another spray cycle without further intervention from the user.

The most preferred embodiment of the invention is depicted in FIGS. 17-28. There is a bottle 301 that contains a shower cleaning chemical and is retained in a sealed relationship with nest 302 in an inverted configuration. The bottle is made sufficiently rigid (e.g. via wall thickening, reinforcing, or otherwise) to avoid the likelihood of the bottle walls deforming significantly inwardly under a vacuum as great as negative 3 psi. The seal between the bottle and nest can be achieved at the bottom of the bottle, and/or via peripheral O-rings (not shown), and/or via other sealing systems. A fill tube 303 extends down from the nest, inside of a rotatable drive shaft 304 down into a spinnable dish 305.

Figure 23:
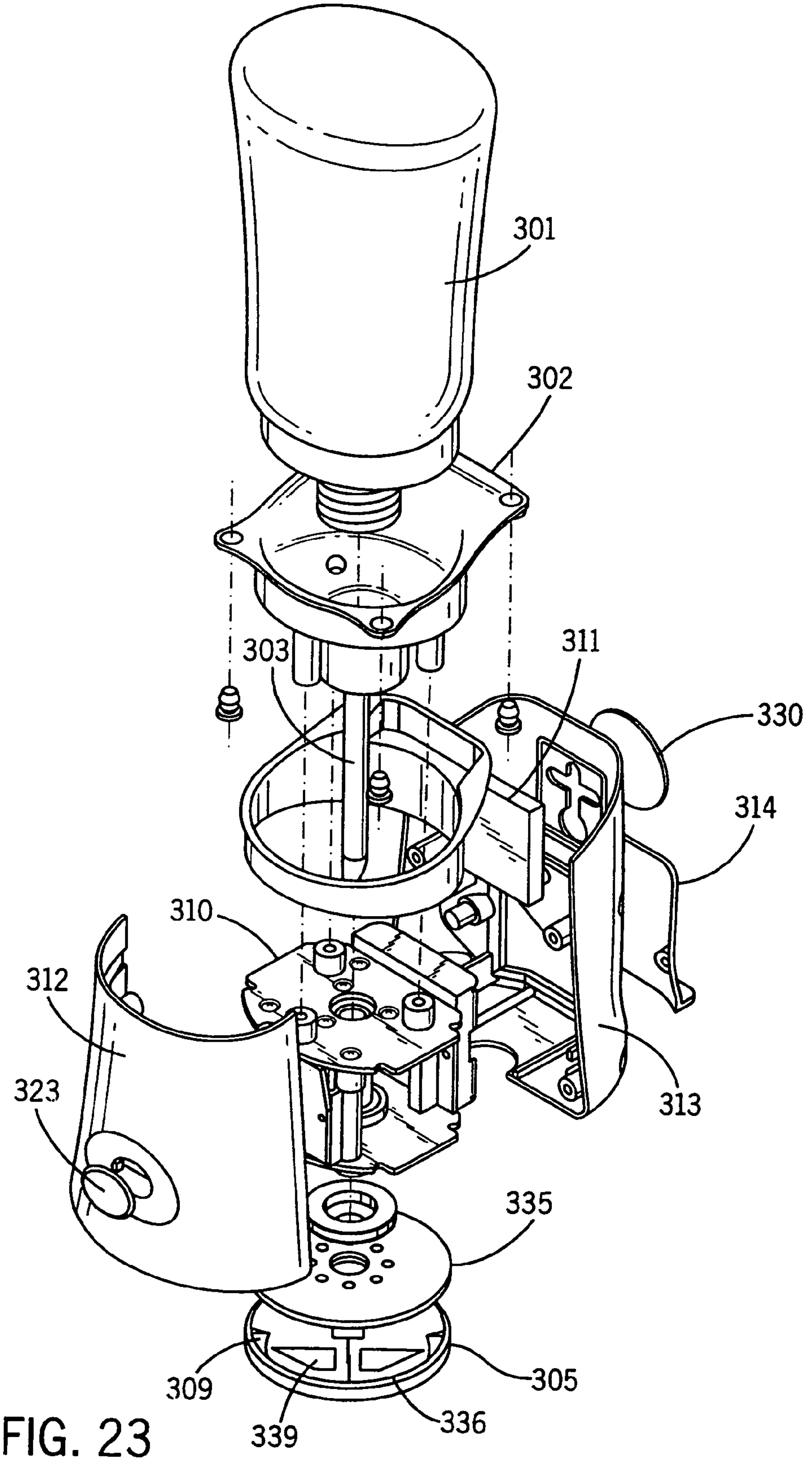
FIG. 23 is an exploded top perspective view of the FIG. 17 sprayer.
Figure 24:
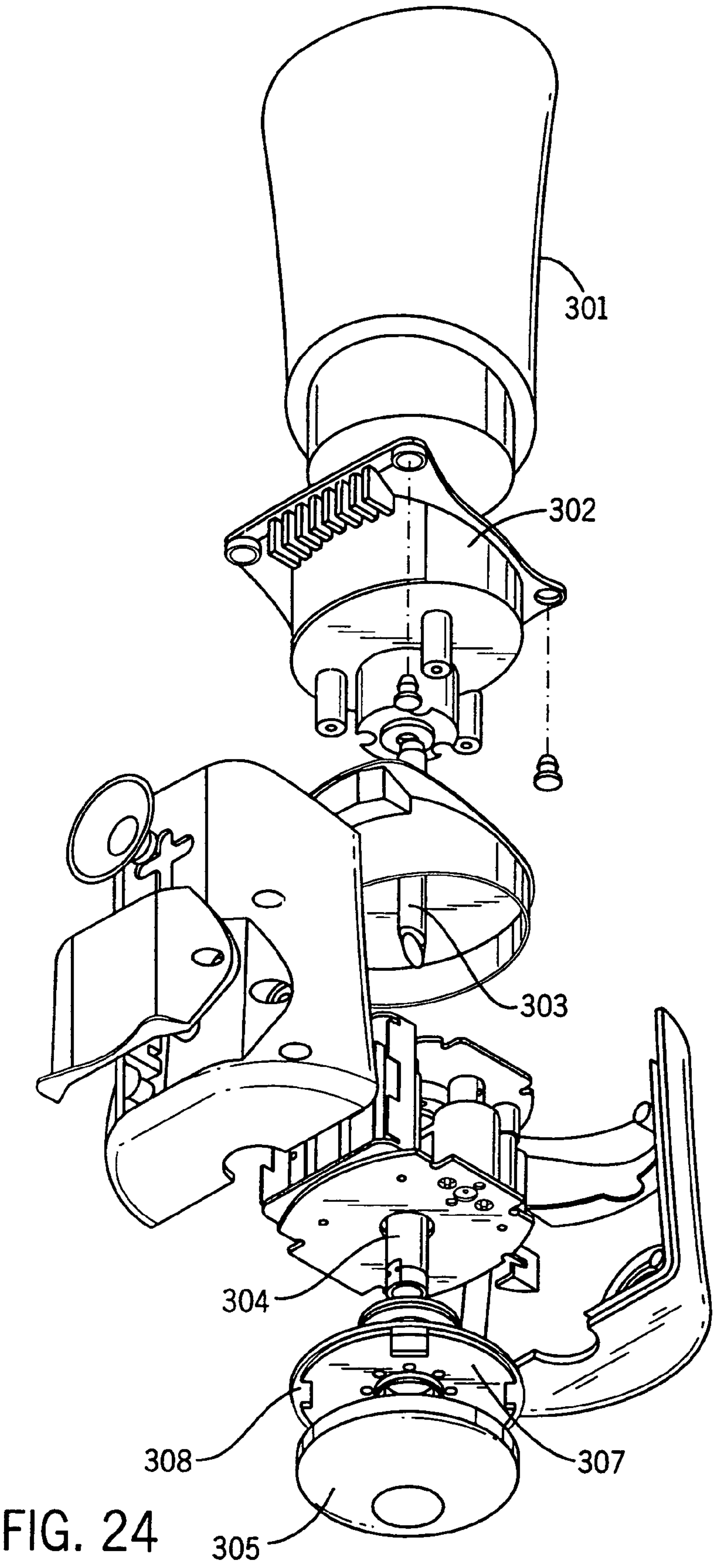
FIG. 24 is an exploded bottom perspective view thereof.
Figure 25:
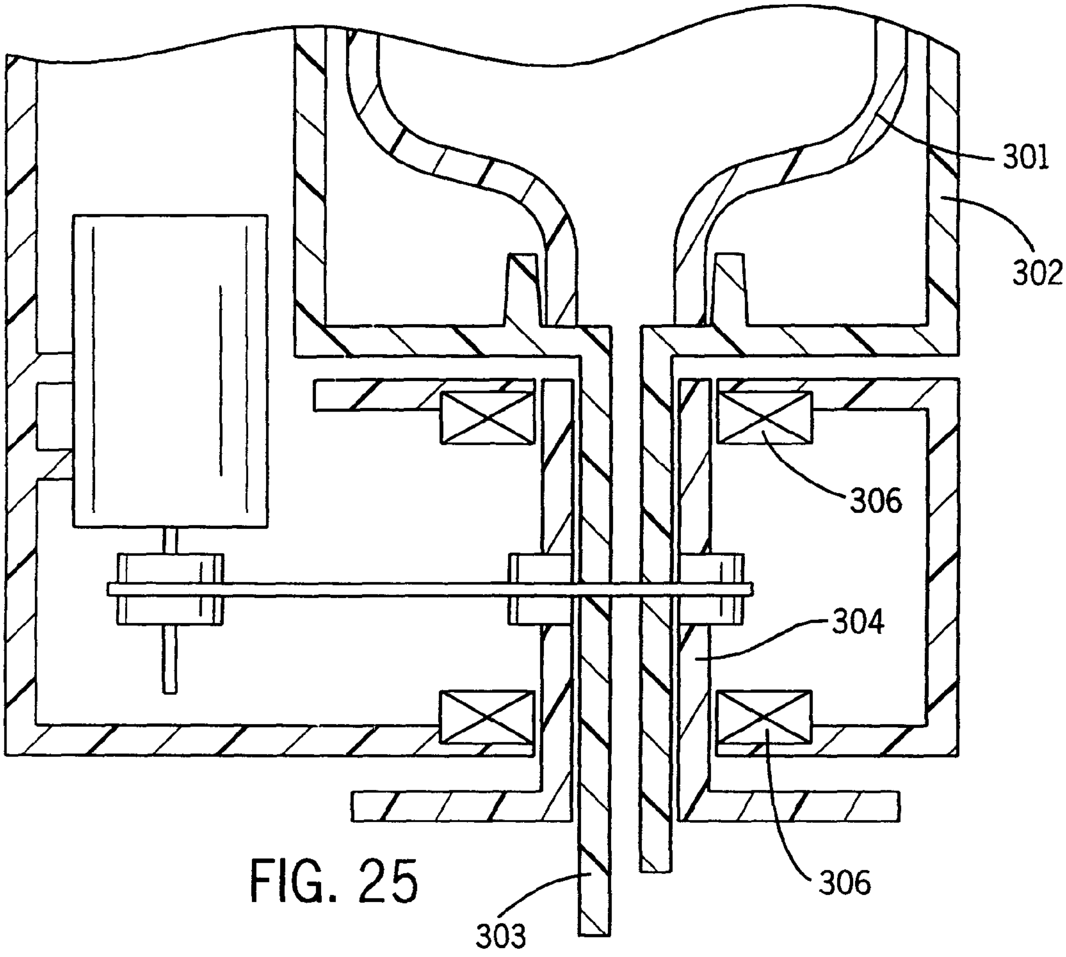
FIG. 25 is a partial schematic sectional view of the linkage of the motor to the cup lid.
Figure 26:
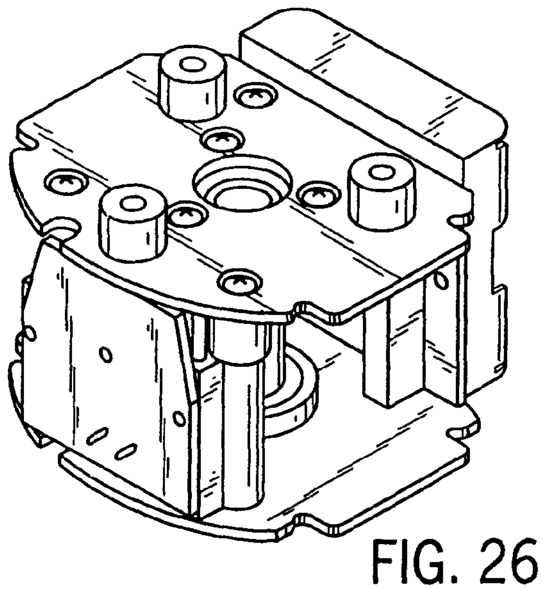
FIG. 26 is a top perspective view of the motor of the FIG. 17 embodiment.
Figure 29:
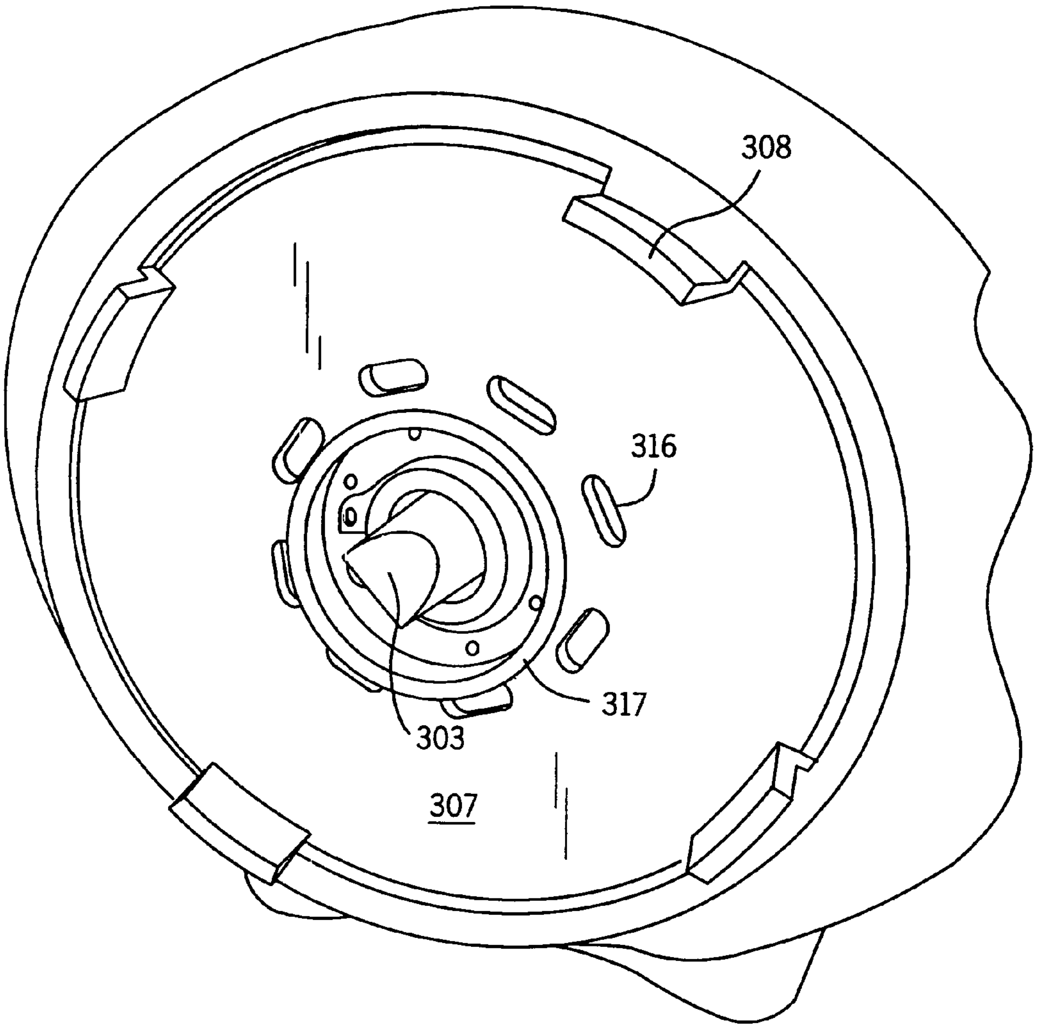
FIG. 29 is a highly enlarged bottom perspective view of the lid attached to the device.

The shaft 304 rotates in bearings 306 and has mounted on its lower end (e.g. via a c-clip) a lid 307 (FIG. 24). The lid has feet 308 that clip into gripping pockets 309 in the dish 305 (FIG. 23). As shown in FIG. 29, the lid can have drain holes 316 around protector ring 317. If the device is accidentally inverted when there is liquid in the dish 305, the liquid will therefore tend to drain out holes 316 rather than having a tendency to leak back towards to motor 310.

Motor 310 is powered by a battery unit 31 The motor is protected from the shower environment by two halves of a housing 312/313 that are screwed together from the rear.

A rear door 314 is provided on the rear housing member 313 for providing access to the battery unit once the housing parts 312/313 are assembled (FIG. 24). As shown in FIG. 27, a motor drive 320 drives a pulley system 321/322, with the belt in turn driving the drive shaft 304, and thus the spinning dish 305. Alternatively, gears could be used to make the connection between the motor drive and the drive shaft.

The motor is activated via the push button 323. The use of the belt drive permits the speed of the shaft and the subsequent speed of the dish to be variable based on motor speed. Thus, by selection of a variable speed motor, one can alter spray patterns for different size enclosures.

Figure 17:
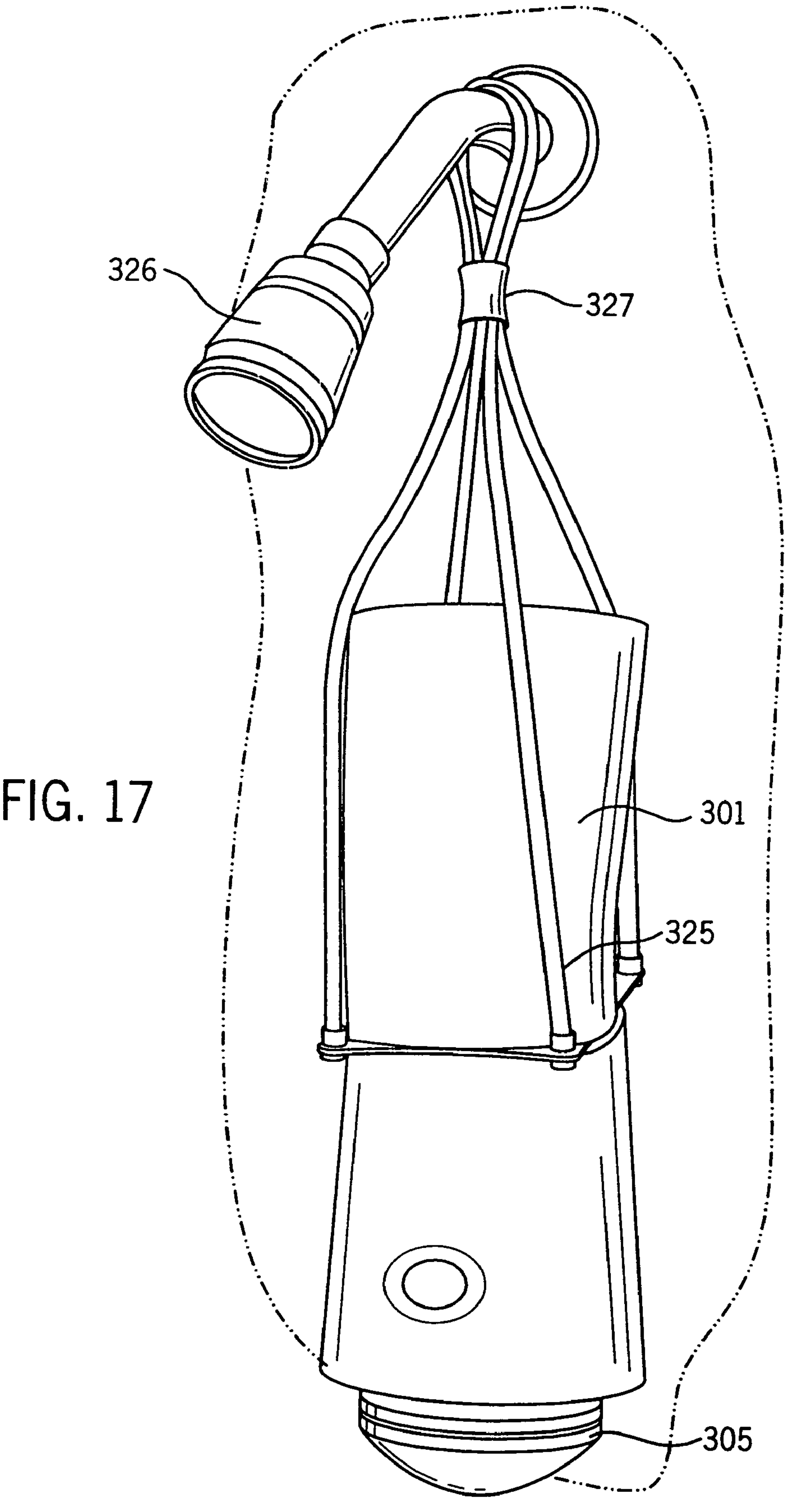
FIG. 17 is a frontal lower, perspective view of a preferred alternative embodiment hung from a shower head.
Figure 18:
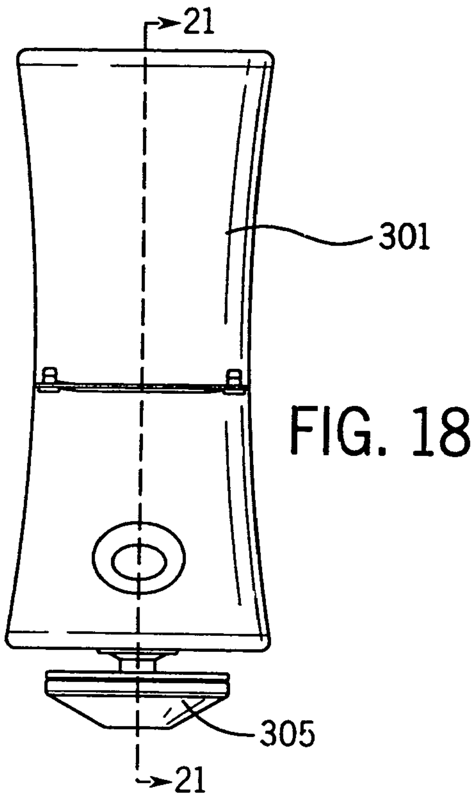
FIG. 18 shows a front elevational view thereof.
Figure 19:
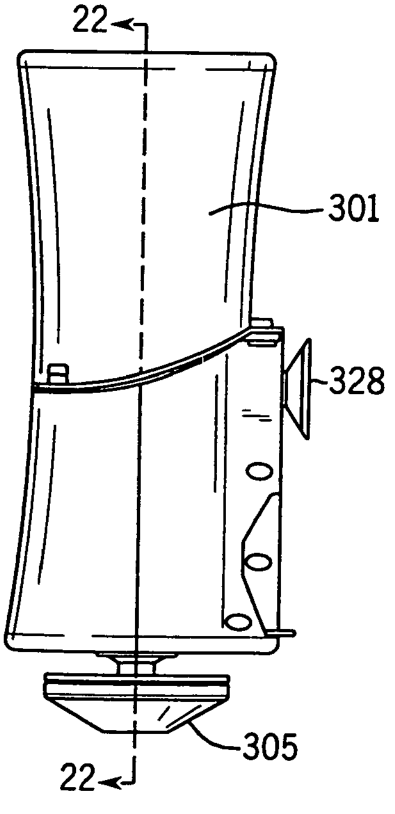
FIG. 19 is a right side elevational view thereof.

As shown in FIGS. 17 and 19, two cables 325 can be connected to the four corners of nest 302, with the resulting two loops being suitable to loop over the shower head 326. Flexible band 327 is slideable along the two loops to control length. A rear suction cup 328 may also be positioned on housing part 313.

Turning specifically to the dish 305, as can be seen in FIGS. 21 and 23, it can be covered with a lid 335 with an o-ring 336 there between. The main body of the dish can have opposed sides openings 336 and 337, which may be of different configurations and/or sizes. Thus, one configuration can be suitable to spray a long distance for any given rotational speed, and the other can be suitable to reach very high and very low areas (e.g. an elongated vertical slot). Vanes 339 can help impart rotational force to the liquid.

Figure 30:
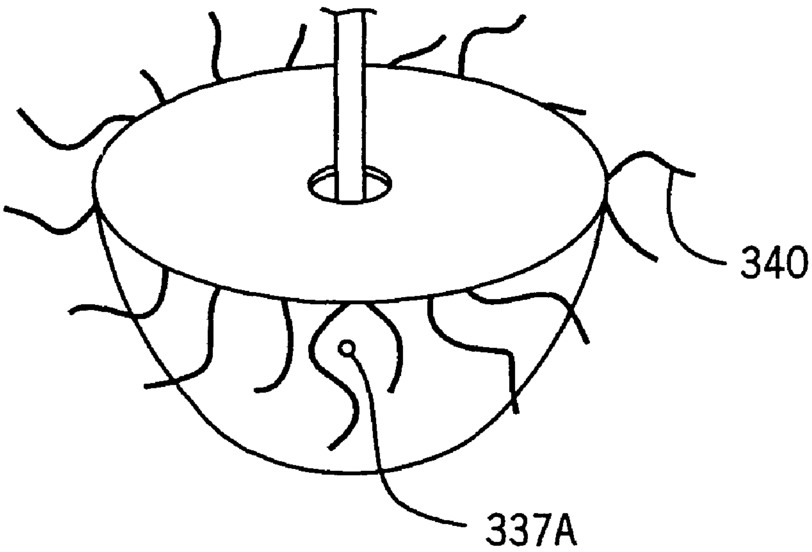
FIG. 30 is a upper perspective view of one alternative cup/lid/drive shaft assembly.

As shown in FIG. 30, a series of flexible fibers 340(e.g. made of a plastic) can be trapped between the lid and dish so that as water is exiting from the dish opening (e.g. 337A) it will be further dispersed by flailing fibers.

As fluid from the refillable container drains down the fill tube, it pools in the dish. When the rest level of fluid in the dish is high enough it cuts off air venting to the refill bottle, thereby slowing and eventually cutting off drainage until the next spin cycle. As the motor in this embodiment is above the dish, liquid cannot leak from the dish down by gravity into the electrical parts.

Figure 31:
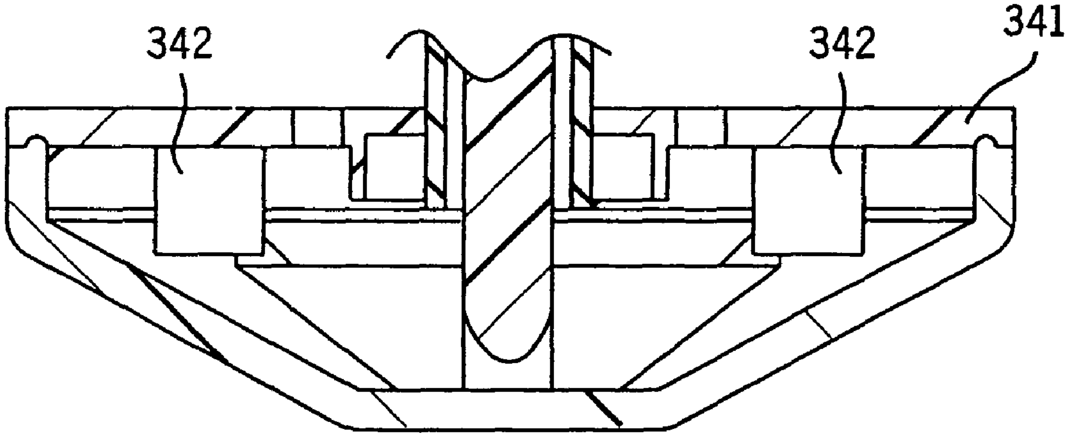
FIG. 31 is a sectional view of a portion of another cup/lid shaft assembly.

Lid 341 can be provided with catch areas 342 as shown in FIG. 31. This will help stop spilling if the entire device is removed from the wall after use and the device is inverted when the dish still has some cleaner in it.

As seen in FIGS. 32 and 33, the interconnection between the bottle and the acceptor/nest can be of the single use type. The bottle 350 can have a fragile flange 351. The sloped entry 352 to the nest will permit the edge of the bottle to enter without breaking. However, the cutouts on the downwardly facing edge of the bottle mouth (judged as the bottle is being inserted) will break off if the bottle is removed. The consumer will not be tempted to refill the bottle with cleaners that are unsuitable because once the mouth flange has cracked off, a fluid tight seal cannot be achieved, and the contents of the bottle will immediately drain out.

Figure 34:
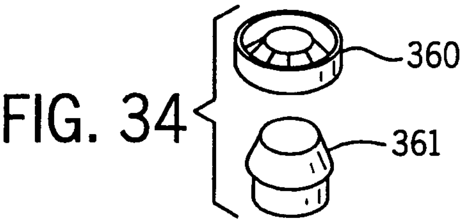
FIG. 34 depicts schematically a single use container end and a receiver element for it.
Figure 35:
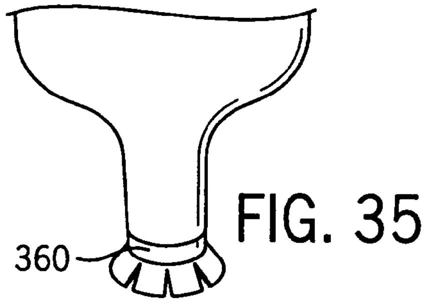
FIG. 35 depicts how the FIG. 33 parts achieve a single use function.

A similar function is depicted in FIGS. 34 and 35. A flip over band 360 can be an integral part of the bottle. Upon removal from connection with piercing post 361 it will flip to a position that prevents reinsertion.

Figure 36:
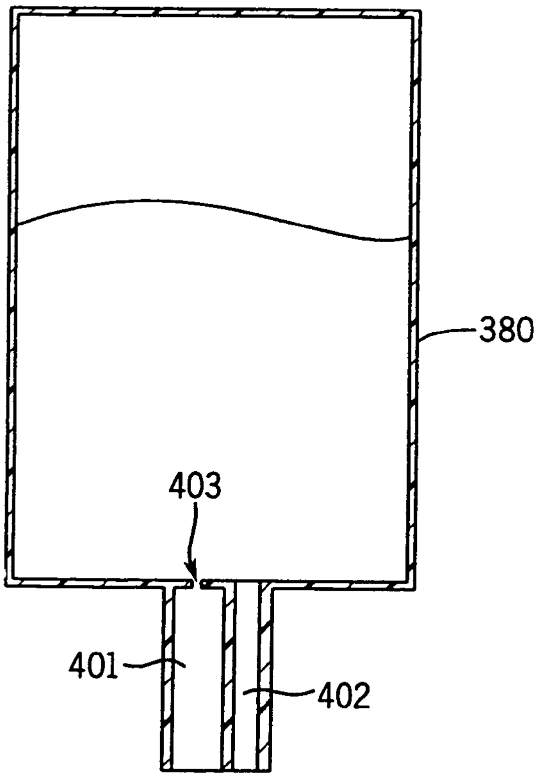
FIG. 36 depicts a container having an outlet structure that can be used to help control the flow of fluid from such containers.

Another possible modification is schematically shown in FIG. 36. The concept is to prevent glugging sounds by facilitating venting of the bottle. In this device, the mouth of the bottle has parallel channels 401 and 402. Aperture 403 controls fluid entry to channel 401.

During a cycle the fluid drains from channel 401 faster than it can refill through the aperture 403. This creates a vent path for air while the fluid continues down in path 402.

Figure 37:
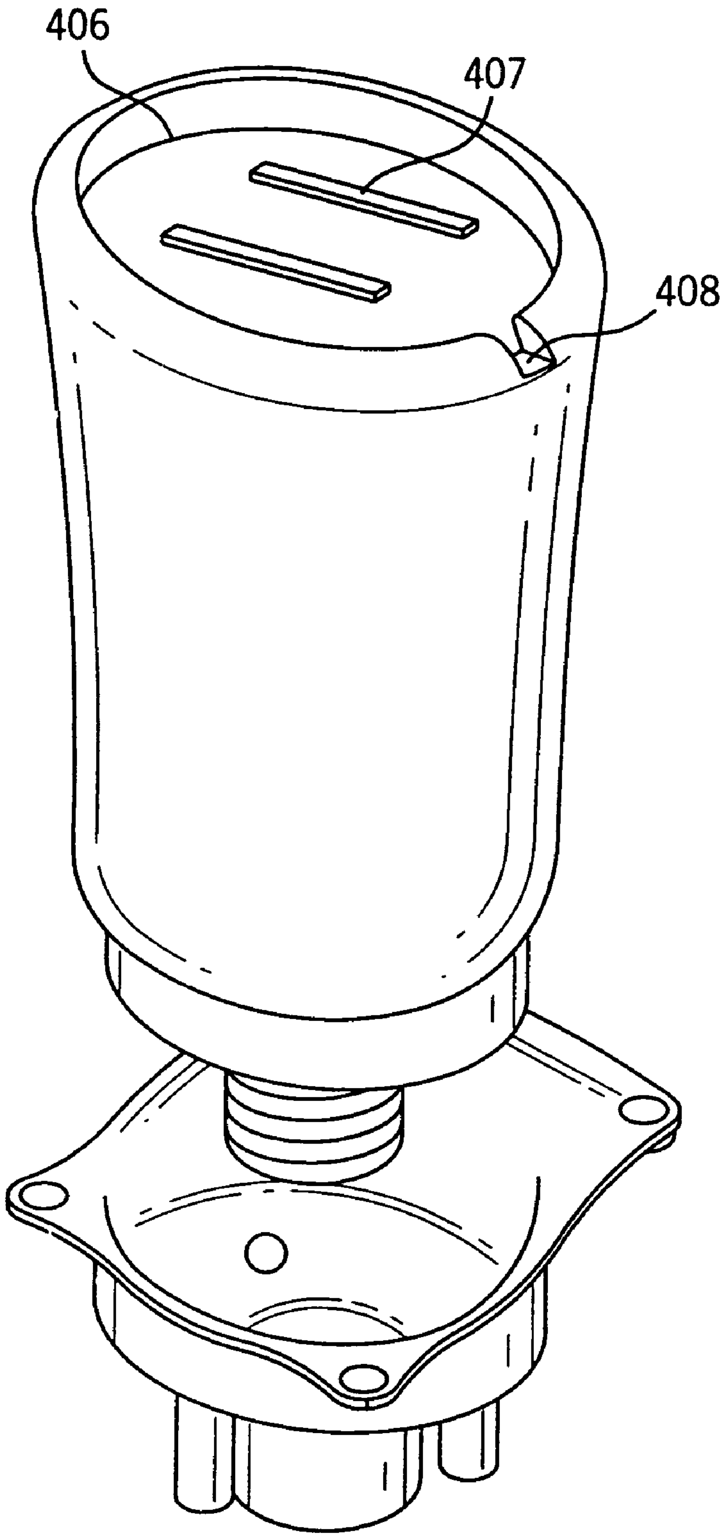
FIG. 37 is a view similar to the upper portion of FIG. 23, but with the bottom of the container having a soap dish formed therein.

FIG. 37 teaches that the container can have a soap dish depression 406, with support stands 407 and a sloped drainage groove 408. This avoids the need for a separate shower caddy to store soap between uses in the shower.

Preferred embodiments of the invention have been described in considerable detail. Many modifications and variations to the preferred embodiments will be apparent to those skilled in the art, which will be within the spirit and scope of the invention. For example, hybrids of the disclosed embodiments could be practiced and the electronic timer, motor and user notification system could be replaced by corresponding mechanical (wind-up) systems known in the art. Therefore, the invention should not be limited to the described embodiments. To ascertain the full scope of the invention, reference should be made to the following claims.

INDUSTRIAL APPLICABILITY

The invention provides a sprayer for automatically spraying the walls of bath and shower enclosures.

We claim:

1. A method of automatically cleaning all internal side walls of a shower enclosure with a liquid cleanser, comprising:

positioning an automated sprayer having a hanger at a selected location in the enclosure by hanging the hanger from a shower head that extends into the enclosure, wherein the sprayer has a container of liquid cleanser and a liquid pumping system capable of delivering liquid cleanser from the selected location to all of said internal side walls;

activating a timer on the sprayer to initiate a first countdown;

at the expiration of the first countdown, automatically spraying liquid cleanser in drops of a size larger than an atomized drop size so as to form a stream to contact all of said side walls with the cleanser in a manner which assists in cleaning all of said side walls; and automatically terminating the spray cycle at the expiration of a second countdown following the first countdown;

wherein the sprayer has a motorized spray head which is mounted within the enclosure to rotate during the spraying to impart centrifugal force to the liquid cleanser;

whereby all of said side walls are at least to some extent cleaned by said spraying; and wherein said automated sprayer is non-integrally mounted within said enclosure without damaging a wall of the enclosure but also in contact with one of the side walls;

wherein the sprayer has a tray sized to receive the container in an inverted fashion.

2. The method of claim 1, wherein the sprayer further comprises:

a metering system for controlling flow of the cleanser;

a spray head for spraying cleanser during a spray cycle; and a control for initiating the spray cycle; and automatically terminating it.

3. The method of claim 1, wherein the tray includes an integral tube extending downwardly and through which cleanser can be metered by the metering system to the spray head.

4. The method of claim 1, wherein wherein the sprayer comprises a user notification system including a light or sound alarm that is used during the method to warn a user of impending, delayed, automatic operation of the sprayer after activation of the timer and before spraying begins so that the user has time to cancel spraying before it begins after the alarm has gone off.

5. The method of claim 1, wherein the sprayer, when so mounted, can spray the cleanser even when the sprayer does not receive water from a water supply of a building in which the enclosure is located.

6. The method of claim 1, wherein the container comprises an opening and said opening is positioned downwards when the container is loaded in said sprayer.

7. A method of automatically cleaning all internal side walls of a shower enclosure with a liquid cleanser, comprising:

positioning an automated sprayer having a hanger at a selected location in the enclosure by hanging the hanger from a shower head that extends into the enclosure, wherein the sprayer has a container of liquid cleanser and a liquid pumping system capable of delivering liquid cleanser from the selected location to all of said internal side walls;

activating a timer on the sprayer to initiate a first countdown;

at the expiration of the first countdown, automatically spraying liquid cleanser in drops of a size larger than an atomized drop size so as to form a stream to contact all of said side walls with the cleanser in a manner which assists in cleaning all of said side walls; and automatically terminating the spray cycle at the expiration of a second countdown following the first countdown;

wherein the sprayer has a motorized spray head which is mounted within the enclosure to rotate during the spraying to impart centrifugal force to the liquid cleanser;

whereby all of said side walls are at least to some extent cleaned by said spraying; and wherein said automated sprayer is non-integrally mounted within said enclosure without damaging a wall of the enclosure but also in contact with one of the side walls;

wherein the sprayer further comprises a timer coupled to the metering system for delaying activation thereof after the spray cycle is initiated; and a tray sized to receive the container in an inverted fashion.

8. The method of claim 7, wherein the timer is an electronic timing circuit.

* * * * *